US012592895B2

(12) United States Patent
Ma

(10) Patent No.: US 12,592,895 B2
(45) Date of Patent: Mar. 31, 2026

(54) DATA TRANSMISSION METHOD AND APPARATUS

(71) Applicant: Hangzhou AliCloud Feitian Information Technology Co., Ltd., Hangzhou City (CN)

(72) Inventor: Shu Ma, Hangzhou (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 0 days.

(21) Appl. No.: 18/685,221

(22) PCT Filed: Feb. 2, 2023

(86) PCT No.: PCT/CN2023/074265
§ 371 (c)(1),
(2) Date: Feb. 20, 2024

(87) PCT Pub. No.: WO2023/155690
PCT Pub. Date: Aug. 24, 2023

(65) Prior Publication Data
US 2025/0126070 A1      Apr. 17, 2025

(30) Foreign Application Priority Data

Feb. 15, 2022    (CN) .......................... 202210139287.0

(51) Int. Cl.
*H04L 47/43*          (2022.01)
*H04L 47/34*          (2022.01)

(52) U.S. Cl.
CPC .............. *H04L 47/43* (2022.05); *H04L 47/34* (2013.01)

(58) Field of Classification Search
CPC ......... H04L 47/43; H04L 47/34; H04L 47/12; H04L 69/324; H04L 69/326
See application file for complete search history.

(56) References Cited

U.S. PATENT DOCUMENTS 7,085,869 B1 *  8/2006  Acharya ............... G06F 13/385
                                                710/263
7,680,050 B1 *  3/2010  Sindhu .................. H04L 47/745
                                                370/395.5
(Continued)

FOREIGN PATENT DOCUMENTS

| CN | 106982108 A | 7/2017 |
| CN | 110995697 A | 4/2020 |

(Continued)

OTHER PUBLICATIONS

China National Intellectual Property Administration; International Search Report and Written Opinion issued in PCT App. No. PCT/CN2023/074265 dated May 23, 2023; 13 pages.
(Continued)

*Primary Examiner* — David R Lazaro
(74) *Attorney, Agent, or Firm* — Maschoff Brennan

(57) ABSTRACT

Embodiments of the present specification provide a data transmission method and apparatus, where the data processing method includes: sending a first preset number of sub data packets to a receiving end; setting data information of a first sub data packet in initial sending status information to obtain first sending status information, and constructing an association relationship between the first sending status information and a corresponding field in a sending information maintenance table; in a case that confirmation information returned by the receiving end is received, determining a second sub data packet corresponding to the confirmation information, and determining second sending status information corresponding to the second sub data packet, and removing an association relationship between the second sending status information and a corresponding field in the sending information maintenance table. In this way a reliability of data transmission may be improved.

11 Claims, 8 Drawing Sheets

(56) References Cited

U.S. PATENT DOCUMENTS

| | | | | |
|---|---|---|---|---|
| 10,462,218 | B1 * | 10/2019 | Moraru | H04W 28/065 |
| 11,388,141 | B1 * | 7/2022 | Rupavatharam | H04L 63/0236 |
| 2002/0089930 | A1 * | 7/2002 | Aceves | H04L 1/1832 |
| | | | | 370/235 |
| 2014/0056223 | A1 * | 2/2014 | Quan | H04W 28/18 |
| | | | | 370/328 |
| 2014/0161061 | A1 * | 6/2014 | Kurian | H04L 1/1874 |
| | | | | 370/329 |
| 2016/0050140 | A1 * | 2/2016 | Chinni | H04L 47/34 |
| | | | | 709/242 |
| 2017/0055247 | A1 | 2/2017 | Yu et al. | |
| 2019/0036651 | A1 * | 1/2019 | Chitrakar | H04L 1/1832 |
| 2022/0173872 | A1 * | 6/2022 | Han | H04L 1/1864 |
| 2024/0143891 | A1 * | 5/2024 | Chongala | G06F 15/7825 |

FOREIGN PATENT DOCUMENTS

| | | | |
|---|---|---|---|
| CN | 111865503 | A | 10/2020 |
| CN | 112995685 | A | 6/2021 |
| CN | 113300817 | A | 8/2021 |
| CN | 113708895 | A | 11/2021 |
| CN | 113784389 | A | 12/2021 |
| CN | 114598651 | A | 6/2022 |
| WO | 2018205688 | A1 | 11/2018 |
| WO | 2020042884 | A1 | 3/2020 |
| WO | 2022001416 | A1 | 1/2022 |

OTHER PUBLICATIONS

China National Intellectual Property Adminstration; Notice of Allowance issued in CN App. No. 202210139287.0 dated Jan. 11, 2024; 6 pages.

Moses, Raja et al.; "Efficient Technique to Reduce the Retransmission Latency of Packets from RLC Layer in Carrier Aggregated 5G RAN"; 2020 IEEE International Conference of Electronics, Computing and Communication Technologies; Sep. 16, 2020; 5 pages.

* cited by examiner

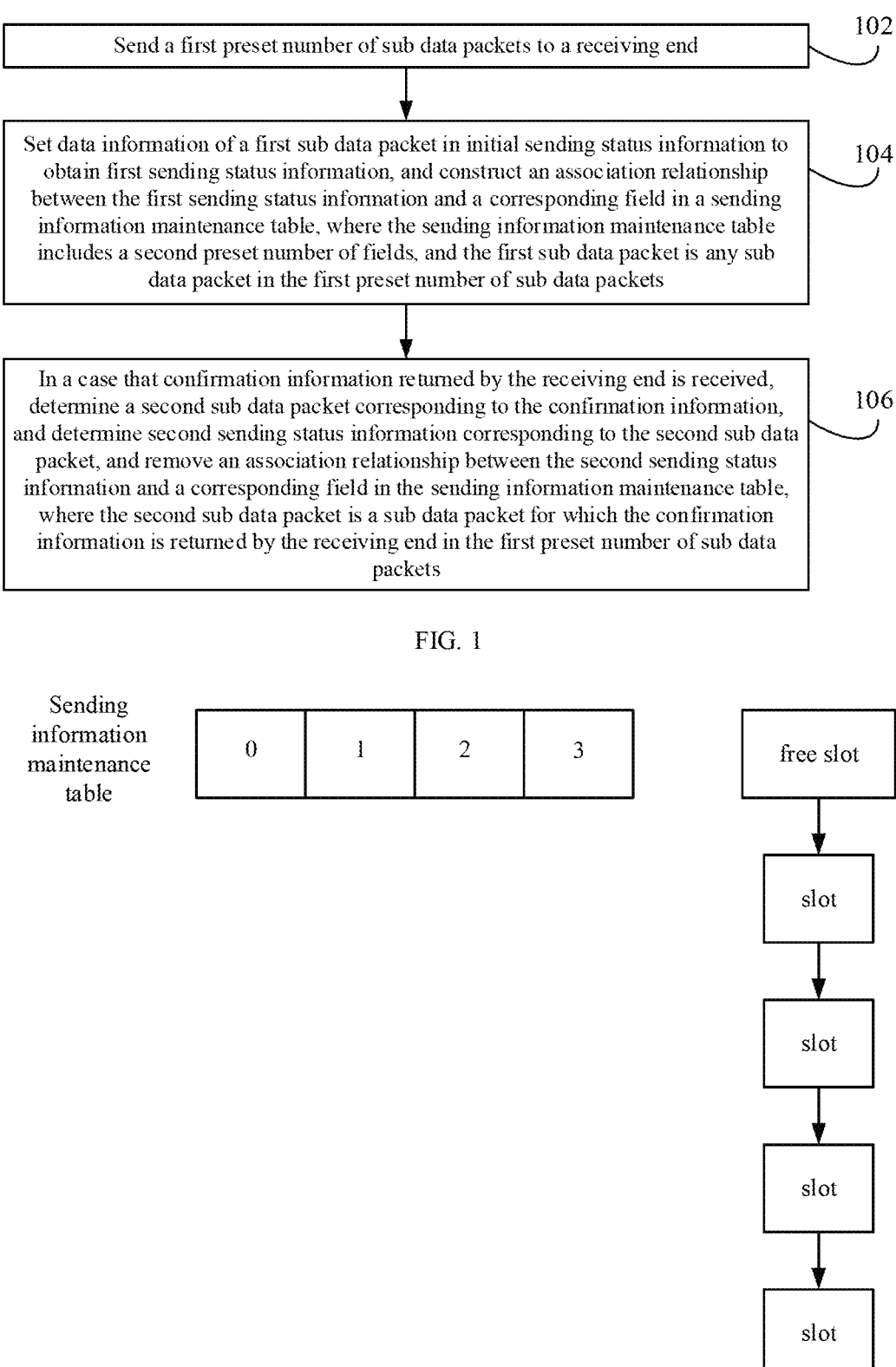

| Send a first preset number of sub data packets to a receiving end | 102 |

| Set data information of a first sub data packet in initial sending status information to obtain first sending status information, and construct an association relationship between the first sending status information and a corresponding field in a sending information maintenance table, where the sending information maintenance table includes a second preset number of fields, and the first sub data packet is any sub data packet in the first preset number of sub data packets | 104 |

| In a case that confirmation information returned by the receiving end is received, determine a second sub data packet corresponding to the confirmation information, and determine second sending status information corresponding to the second sub data packet, and remove an association relationship between the second sending status information and a corresponding field in the sending information maintenance table, where the second sub data packet is a sub data packet for which the confirmation information is returned by the receiving end in the first preset number of sub data packets | 106 |

FIG. 1

Sending information maintenance table

| 0 | 1 | 2 | 3 | free slot slot slot slot slot

FIG. 2a

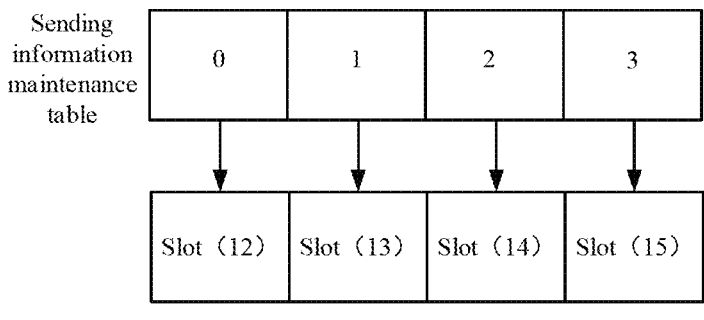
FIG. 2b
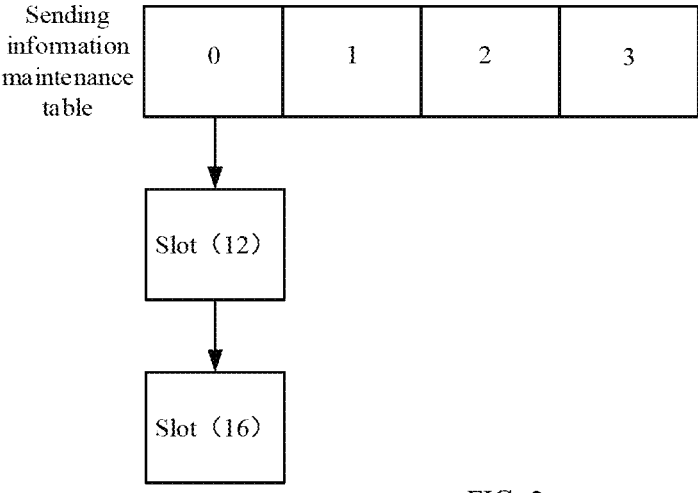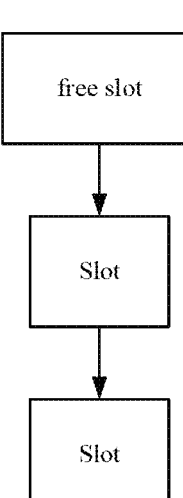
FIG. 2c

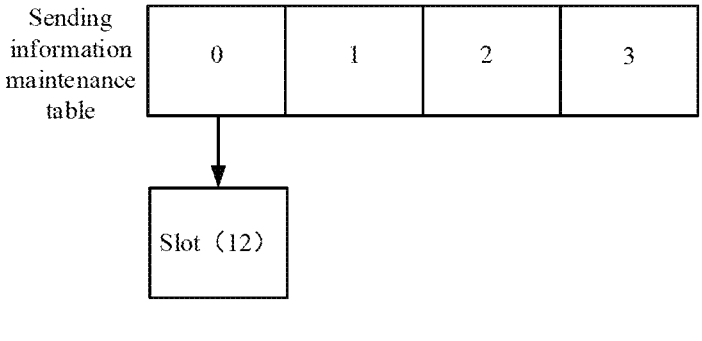
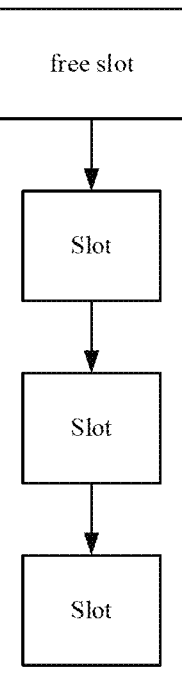
FIG. 2d
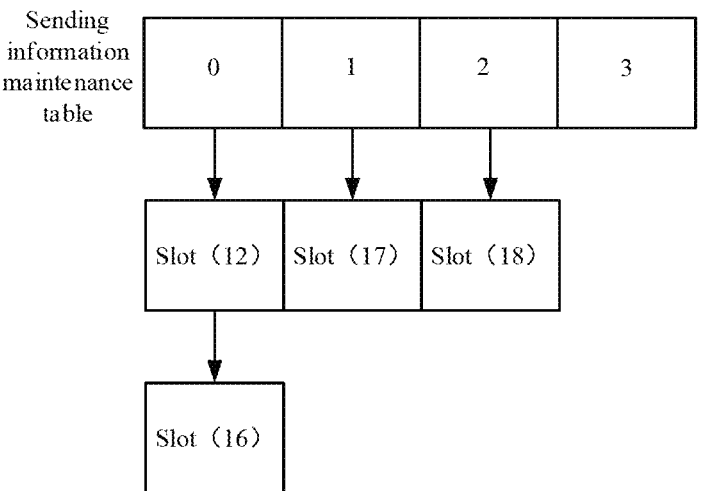
FIG. 2e

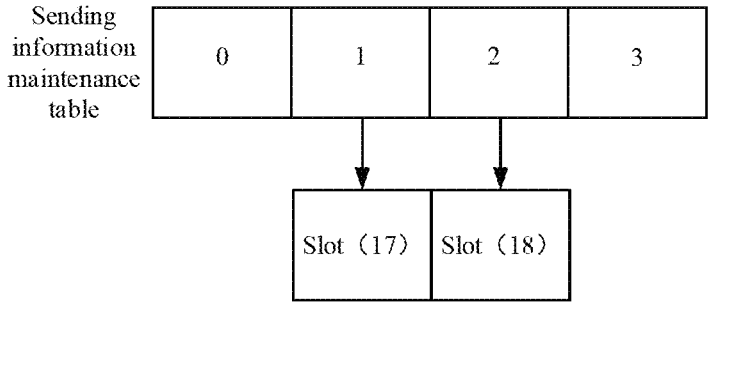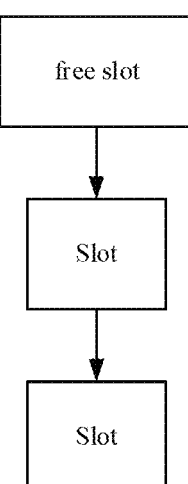
FIG. 2f
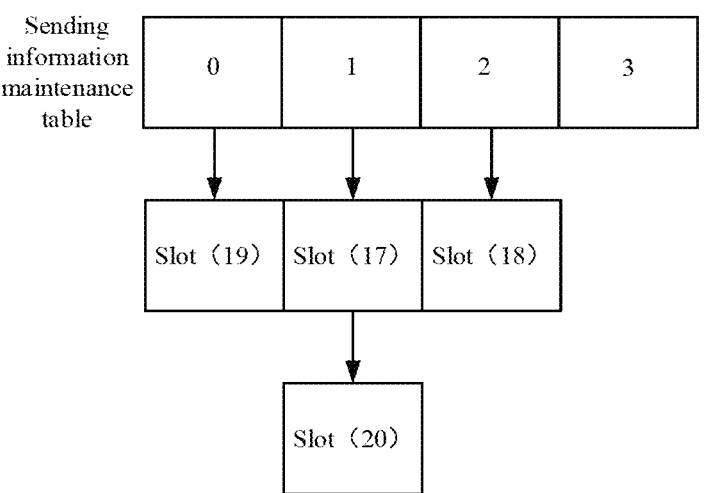
FIG. 2g

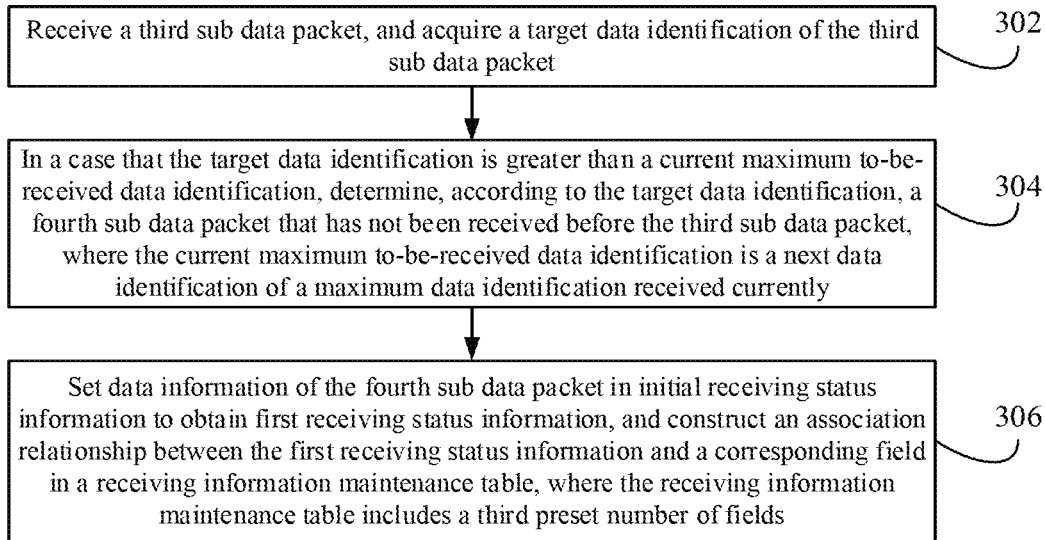

Receive a third sub data packet, and acquire a target data identification of the third sub data packet    302

In a case that the target data identification is greater than a current maximum to-be-received data identification, determine, according to the target data identification, a fourth sub data packet that has not been received before the third sub data packet, where the current maximum to-be-received data identification is a next data identification of a maximum data identification received currently    304

Set data information of the fourth sub data packet in initial receiving status information to obtain first receiving status information, and construct an association relationship between the first receiving status information and a corresponding field in a receiving information maintenance table, where the receiving information maintenance table includes a third preset number of fields    306

FIG. 3

DATA TRANSMISSION METHOD AND APPARATUS

CROSS-REFERENCE TO RELATED APPLICATIONS

The present application is a national stage of International Application No. PCT/CN2023/074265, filed on Feb. 2, 2023, which claims priority to Chinese Patent Application No. 202210139287.0, entitled "Data Transmission Method and Apparatus" and filed with the China National Intellectual Property Administration on Feb. 15, 2022. Both of the aforementioned applications are hereby incorporated by reference in their entireties.

TECHNICAL FIELD

Embodiments of the present specification relate to the field of Internet technologies and, in particular, to a data transmission method and apparatus.

BACKGROUND

With the rapid development of computer technologies and Internet technologies, online tasks are becoming more and more common, followed by a surge in data transmission requirements. Since the large network topology and numerous exchange boards in a data center, as well as the common traffic in current data centers, which have burst and many sources-to-one destination traffic patterns, packet loss resulted by exchange board failure or network congestion in the data center is fundamentally unavoidable. At present, for traditional transport layer protocols, delivery is performed in sequence, a loss of a data packet sent first over a connection will affect a reporting of subsequent data packets at a receiving end, resulting in a head-of-line blocking, which results in the loss of a single data packet, and an overall throughput of a connection for a period of time may be affected, and a series of requests on a same connection is thus affected. Therefore, it is necessary to provide a more reliable data transmission method.

SUMMARY

In view of this, embodiments of the present specification provide a data transmission method. One or more embodiments of the present specification simultaneously relate to a data transmission apparatus, a computing device, a computer readable storage medium, and a computer program to solve technical deficiencies existing in the prior art.

According to a first aspect of an embodiment of the present specification, a data transmission method is provided, which is applied to a sending end, including:

sending a first preset number of sub data packets to a receiving end;

setting data information of a first sub data packet in initial sending status information to obtain first sending status information, and constructing an association relationship between the first sending status information and a corresponding field in a sending information maintenance table, where the sending information maintenance table includes a second preset number of fields, and the first sub data packet is any sub data packet in the first preset number of sub data packets;

in a case that confirmation information returned by the receiving end is received, determining a second sub data packet corresponding to the confirmation information, and determining second sending status information corresponding to the second sub data packet, and removing an association relationship between the second sending status information and a corresponding field in the sending information maintenance table, where the second sub data packet is a sub data packet for which the confirmation information is returned by the receiving end in the first preset number of sub data packets.

According to a second aspect of an embodiment of the present specification, a data transmission method is provided, which is applied to a receiving end, including:

receiving a third sub data packet, and acquiring a target data identification of the third sub data packet;

in a case that the target data identification is greater than a current maximum to-be-received data identification, determining, according to the target data identification, a fourth sub data packet that has not been received before the third sub data packet, where the current maximum to-be-received data identification is a next data identification of a maximum data identification received currently;

setting data information of the fourth sub data packet in initial receiving status information to obtain first receiving status information, and constructing an association relationship between the first receiving status information and a corresponding field in a receiving information maintenance table, where the receiving information maintenance table includes a third preset number of fields.

According to a third aspect of an embodiment of the present specification, a data transmission apparatus is provided, which is applied to a sending end, including:

a sending module, configured to send first preset number of sub data packets to a receiving end;

a first constructing module, configured to: set data information of a first sub data packet in initial sending status information to obtain first sending status information, and construct an association relationship between the first sending status information and a corresponding field in a sending information maintenance table, where the sending information maintenance table includes a second preset number of fields, and the first sub data packet is any sub data packet in the first preset number of sub data packets;

a removing module, configured to: in a case that confirmation information returned by the receiving end is received, determine a second sub data packet corresponding to the confirmation information, and determine second sending status information corresponding to the second sub data packet, and remove an association relationship between the second sending status information and a corresponding field in the sending information maintenance table, where the second sub data packet is a sub data packet for which the confirmation information is returned by the receiving end in the first preset number of sub data packets.

According to a fourth aspect of an embodiment of the present specification, a data transmission apparatus is provided, which is applied to a receiving end, including:

a receiving module, configured to receive a third sub data packet, and acquire a target data identification of the third sub data packet;

a first determining module, configured to: in a case that the target data identification is greater than a current maximum to-be-received data identification, determine, according to the target data identification, a fourth sub data packet that has not been received before the third sub data packet, where the current maximum to-be-received data identification is a next data identification of a maximum data identification received currently;

a second constructing module, configured to: set data information of the fourth sub data packet in initial receiving status information to obtain first receiving status information, and construct an association relationship between the first receiving status information and a corresponding field in a receiving information maintenance table, where the receiving information maintenance table includes a third preset number of fields.

According to a fifth aspect of an embodiment of the present specification, a computing device is provided, including:

a memory and a processor;

the memory is used to store computer executable instructions, and the processor is used to execute the computer executable instructions, when the computer executable instructions are executed by the processor, steps of the above data transmission method are implemented.

According to a sixth aspect of an embodiment of the present specification, a computer readable storage medium is provided, having computer executable instructions stored therein, when the instructions are executed by a processor, steps of the above data transmission method are implemented.

According to a seventh aspect of an embodiment of the present specification, a computer program is provided, where when the computer program is executed in a computer, the computer is caused to execute steps of the above data transmission method.

An embodiment of the present specification provides a data transmission method, in which a sending end may: send a first preset number of sub data packets to a receiving end, then set data information of a first sub data packet in initial sending status information to obtain first sending status information, and construct an association relationship between the first sending status information and a corresponding field in a sending information maintenance table, where the sending information maintenance table includes a second preset number of fields, and the first sub data packet is any sub data packet in the first preset number of sub data packets; in a case that confirmation information returned by the receiving end is received, determine a second sub data packet corresponding to the confirmation information, determine second sending status information corresponding to the second sub data packet, and remove an association relationship between the second sending status information and a corresponding field in the sending information maintenance table, where the second sub data packet is a sub data packet for which the confirmation information is returned by the receiving end in the first preset number of sub data packets. In this case, after sending sub data packets to the receiving end, the sending end can maintain, based on the sending information maintenance table, a sending status of each sub data packet sent by the sending end, and the receiving end receives the respective sub data packets without a need to have such receiving be performed in sequence. The receiving end may return confirmation information for a sub data packet to the sending end after the sub data packet is received by the receiving end. After the sending end receives the confirmation information returned by the receiving end, it means that the sub data packet is sent successfully. At this time, an association relationship between sending status information corresponding to the sub data packet and the corresponding field in the sending information maintenance table may be removed, and there is no need to continue caring the sending status of the sub data packet. In this way, the sending end may know a current status of the each sub data packet based on the sending information maintenance table, thereby knowing which sub data packet has not been sent successfully. When a small amount of packet loss occurs, not only the sub data packets behind a packet loss point may be successfully sent to the receiving end, but also subsequent sub data packets can be continued to be sent without affecting a subsequent bandwidth of the connection at all. That is, the loss of a certain sub data packet will not affect the sending of the subsequent sub data packets, avoiding head-of-line blocking, and it may be clearly known that which sub data packet is not sent successfully, a reliability of data transmission may be improved.

An embodiment of the present specification provides a data transmission method, in which a receiving end may: receive a third sub data packet, acquire a target data identification of the third sub data packet, in a case that the target data identification is greater than a current maximum to-be-received data identification, determine, according to the target data identification, a fourth sub data packet that has not been received before the third sub data packet, where the current maximum to-be-received data identification is a next data identification of a maximum data identification received currently; set data information of the fourth sub data packet in initial receiving status information to obtain first receiving status information, and construct an association relationship between the first receiving status information and a corresponding field in a receiving information maintenance table, where the receiving information maintenance table includes a third preset number of fields. In this case, after receiving the third sub data packet, the receiving end may acquire the target data identification of the third sub data packet, and determine a recording manner subsequently applied to the third sub data packet based on the target data identification. In the case that the target data identification is greater than the current maximum to-be-received data identification, the receiving end may determine, according to the target data identification, the fourth sub data packet that has not been received before the third sub data packet, and maintain, based on the receiving information maintenance table, a receiving status of each fourth sub data packet which should have been received in accordance with the sequence but has not been received in fact, thereby knowing which sub data packet has not been received successfully. When a small amount of packet loss occurs, not only the sub data packets behind a packet loss point may be successfully received and reported to an application layer, but also subsequent sub data packets can be continued to be received without affecting a subsequent bandwidth of the connection at all. That is, the loss of a certain sub data packet will not affect the receiving and reporting of the subsequent sub data packets, avoiding head-of-line blocking, and it may be clearly known that which sub data packet is not received successfully, a reliability of data transmission may be improved.

BRIEF DESCRIPTION OF DRAWINGS

FIG. 1 is a flow chart of a data transmission method provided by an embodiment of the present specification.

FIG. 2a is a schematic diagram of a first type of a sending information maintenance table provided by an embodiment of the present specification.

FIG. 2*b* is a schematic diagram of a second type of a sending information maintenance table provided by an embodiment of the present specification.

FIG. 2*c* is a schematic diagram of a third type of a sending information maintenance table provided by an embodiment of the present specification.

FIG. 2*d* is a schematic diagram of a fourth type of a sending information maintenance table provided by an embodiment of the present specification.

FIG. 2*e* is a schematic diagram of a fifth type of a sending information maintenance table provided by an embodiment of the present specification.

FIG. 2*f* is a schematic diagram of a sixth type of a sending information maintenance table provided by an embodiment of the present specification.

FIG. 2*g* is a schematic diagram of a seventh type of a sending information maintenance table provided by an embodiment of the present specification.

FIG. 3 is a flow chart of another data transmission method provided by an embodiment of the present specification.

DESCRIPTION OF EMBODIMENTS

Figure 4:
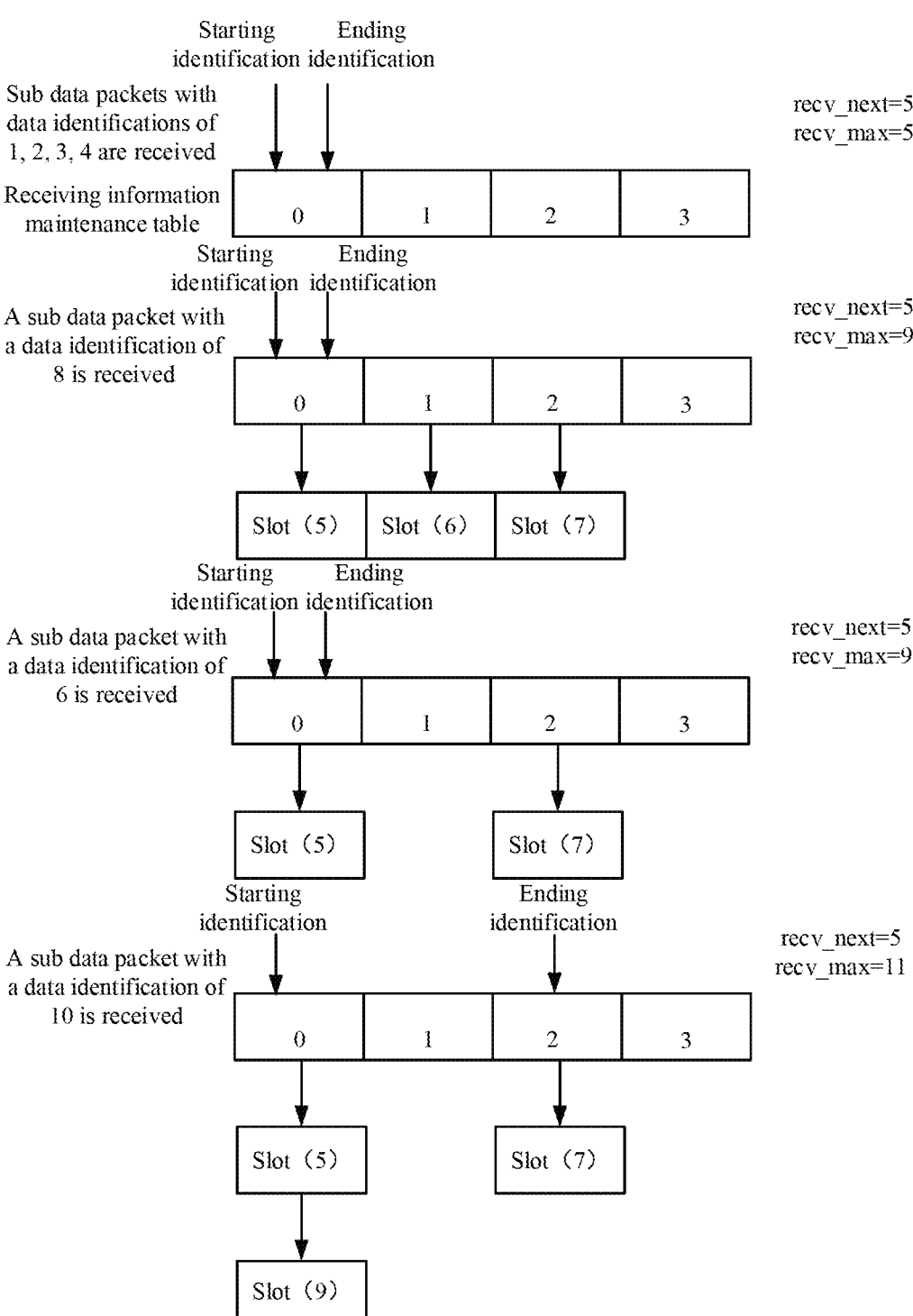
FIG. 4 is a schematic diagram of a receiving information maintenance table provided by an embodiment of the present specification.

Many specific details are expounded in the following description to facilitate a fully understanding of the present specification. However, the present specification can be implemented in many other ways different from those ways described here, those skilled in the art may make similar extensions without violating a connotation of the present specification. Therefore, the present specification is not limited by the specific implementation disclosed below.

The terms used in one or more embodiments of the present specification is only for the purpose of describing particular embodiments, and is not intended to limit the one or more embodiments of the present specification. As used in one or more embodiments of the present specification and the appended claims, singular forms "a" and "the" are intended to include the plural forms as well, unless the context clearly represents other meanings. It should also be understood that the term "and/or" as used in one or more embodiments of the present specification refers to and includes any and all possible combinations of one or more of the associated listed items.

It should be understood that although the terms first, second, etc. may be used to describe various information in one or more embodiments of the present specification, the information should not be limited to these terms. These terms are only used to distinguish information of the same type from each other. For example, without departing from the scope of one or more embodiments of the present specification, the first may also be called the second, and similarly, the second may also be called the first. Depending on the context, the word "if" as used herein may be interpreted as "when" or "while" or "in response to determining".

First, terminologies used in one or more embodiments of the present specification are explained.

Orderly reporting: a receiving end of a communication submits received data to an upper layer in an order in which it was sent.

Out-of-order reporting: a receiving end of a communication submits received data to an upper layer without a need to have such submission be performed in an order in which it was sent.

Head-of-line blocking: for communication between two ends, some messages are affected by various factors such as the previous message being not delivered or lost, resulting in these messages unable to be delivered to an upper level either. This is called line head blocking, also known as HOL (head-of-line blocking) in English.

Reliable transmission: a mechanism to ensure that messages from one end can be delivered to the other end intactly, without loss, without error, and without repetition, and typical solutions include TCP and QUIC.

TCP: Transmission Control Protocol, transmission control protocol, TCP is a transport layer (Transport layer) communication protocol that is connection oriented (connection-oriented), reliable, byte stream-based.

UDP: it is an abbreviation of User Datagram Protocol, the Chinese name is user datagram protocol, which is a connectionless transport layer protocol that provides transaction-oriented simple and unreliable information transfer services. The UDP protocol and TCP protocol are both used to process data packets, UDP provides a method for applications to send encapsulated IP packets without establishing a connection. For a transport layer of the Internet, there are two main protocols that complement each other, and a connectionless one is UDP, which is nothing special beyond giving applications the ability to send packets and allowing them to architect their own protocols at the desired level; and the connection-oriented one is TCP, and the protocol does almost everything.

ACK (Acknowledgement): that is an acknowledgment character, in data communication, a transmission control character sent by a receiving end to a sending end, representing that the data sent has been confirmed to be received without error. In the TCP/IP protocol, if a receiving end successfully receives the data, it will reply with an ACK data, usually an ACK signal has its own fixed format and size of length, and is sent by the receiving end to a sending end.

In the present specification, a data transmission method is provided. The present specification also relates to a data transmission apparatus, a computing device, and a computer readable storage medium, which will be illustrated in detail one by one in the following embodiments.

Referring to FIG. 1, FIG. 1 shows a flow chart of a data transmission method according to an embodiment of the present specification, which is applied to a sending end, and specifically includes the following steps.

Step 102, send a first preset number of sub data packets to a receiving end.

It should be noted that the first preset number may refer to a preset maximum number of sending windows, that is, the maximum number of sub data packets sent each time. For example, the first preset number may be 4, 8, 16, etc. In addition, sub data packets sent to the receiving end may be UDP data packets, thereby supporting out-of-order reporting.

In an optional implementation of the embodiment, a to-be-transmitted data packet may be split to obtain multiple sub data packets, and then each sub data packet is sent to the receiving end, that is, before the sending the first preset number of sub data packets to the receiving end, the method may further include:

splitting a to-be-transmitted data packet into at least two sub data packets;

setting a starting data identification for a headmost sub data packet among the at least two sub data packets;

setting, according to the starting data identification, a corresponding data identification for a sub data packet following the headmost sub data packet in the at least two sub data packets.

Specifically, the starting data identification is a data identification of the headmost sub data packet in the at least two sub data packets, and the data identification of the sub data packet may refer to a number, a letter, and other identifier used to identify a sequence of the sub data packets. For example, the data identification of the sub data packet may be a sequence number of the sub data packet.

It should be noted that a size of the to-be-transmitted data packet is limited by an IP layer MTU (a maximum size of the data packet that may be transmitted), when the to-be-transmitted data packet is large, in order to prevent the IP layer packet fragmentation, the to-be-transmitted data packet may be split into at least two sub data packets, and then the at least two sub data packets obtained from splitting will be sequentially sent to the receiving end.

In actual applications, after the to-be-transmitted data packet is split into the at least two sub data packets, the starting data identification may be set for the headmost sub data packet of the at least two sub data packets, and then based on the set starting data identification, the corresponding data identification is set for the sub data packet after the headmost sub data packet in the at least two sub data packets. Specifically, the starting data identification of the headmost sub data packet may be set randomly, and then the data identifications of the sub data packets after the headmost sub data packet in the at least two sub data packets may be set to increase in sequence.

As an example, the to-be-transmitted data packet is split into 7 sub data packets, the starting data identification of the headmost sub data packet is 12, and the data identifications of 6 sub data packets after the headmost sub data packet are 13, 14, 15, 16, 17 and 18 in sequence.

In the embodiment of the present specification, in order to avoid that the to-be-transmitted data packet is too large, the to-be-transmitted data packet may also be split into the at least two sub data packets, and corresponding data identification is set for each sub data packet, the respective sub data packets obtained from splitting will be sequentially sent to the receiving end, and at a time of sending the sub data packet to the receiving end, a corresponding data identification may also be carried to inform the receiving end which sub data packet is received.

Step 104, set data information of a first sub data packet in initial sending status information to obtain first sending status information, and construct an association relationship between the first sending status information and a corresponding field in a sending information maintenance table, where the sending information maintenance table includes a second preset number of fields, and the first sub data packet is any sub data packet in the first preset number of sub data packets.

Specifically, the initial sending status information is a sending status recording structure that is preset and with empty content; the first sub data packet is any sub data packet among the first preset number of sub data packets, that is, each sub data packet in the first preset number of sub data packets may be used as the first sub data packet, with relevant sending status information being recorded; the first sending status information is information recording a sending status of the first sub data packet. The sending information maintenance table may be a recording table that is preset and can maintain the sending status of each sub data packet. For example, the sending information maintenance table may be a hash table including a second preset number of fields, where the second preset number may be a number of fields that are preset and included in the sending information maintenance table. The second preset number may be the same as the first preset number, or may be different, for example, the second preset number may be 4, 8, 16, etc.

It should be noted that after the data information of the first sub data packet is recorded in the initial sending status information, the first sending status information recording the sending status of the first sub data packet can be obtained. The association relationship between the first sending status information and the corresponding field in the sending information maintenance table is constructed to maintain the sending status of each sub data packet through the sending information maintenance table. Specifically, the constructing the association relationship between the first sending status information and the corresponding field in the sending information maintenance table may be that the first sending status information is bound to the corresponding field in the sending information maintenance table, then the first sending status information bound on the respective field in the sending information maintenance table may be viewed subsequently.

In an optional implementation of the embodiment, before the data information of the first sub data packet is recorded, multiple pieces of initial sending status information with empty content may also be preset, that is, before setting the data information of the first sub data packet in the initial sending status information to obtain the first sending status information, the method may further include:

presetting the first preset number of pieces of initial sending status information with empty content;

setting each piece of initial sending status information as an idle information table.

It should be noted that the initial sending status information is of a structure that is preset and may record the sending status of the sub data packet that has been sent. For example, the initial sending status information is a slot (slot) that may record information, so if the sending end sends several sub data packets to the receiving end, it is necessary to record the sending status of these several sub data packets, that is, a number of pieces of the initial sending status information which is preset and with empty content should be the same as a maximum number of sending windows (the first preset number). That is, the first preset number of pieces of initial sending status information with empty content are preset, and when none of the data information of the sub data packet is recorded, the respective initial sending status information may be set as the idle information table.

In actual applications, when the respective initial sending status information is set as the idle information table, the association relationship between the respective initial sending status information and the idle information table may be constructed, that is, the respective initial sending status information is bound to the idle information table.

For example, FIG. 2a is a schematic diagram of a first type of a sending information maintenance table provided by an embodiment of the present specification. As shown in FIG. 2a, the sending information maintenance table is a hash table including 4 fields, field number of the 4 fields is respectively 0, 1, 2, 3. In an initial state, none of the 4 fields in the sending information maintenance table is bound to a slot corresponding to a sub data packet. 4 pre-created slots with empty content are bound to a free slot.

In the embodiments of the present specification, a first preset number of pieces of initial sending status information with empty content may be preset, and each piece of initial sending status information may be set as an idle information table. After a sending end sends a sub data packet to a receiving end, data information of the respective sub data packet sent by the sending end may be set in the initial sending status information to record a sending status of the respective sub data packet to improve a reliability of data transmission.

In an optional implementation of the embodiment, the initial sending status information includes a data identification field and a confirmation information identification field, and the confirmation information identification field is used to identify whether confirmation information returned by the receiving end for the first sub data packet has been received. At this time, a specific implementation process for setting the data information of the first sub data packet in the initial sending status information to obtain the first sending status information may be as follows:

determining a data identification of the first sub data packet, and setting the data identification of the first sub data packet for the data identification field in the initial sending status information;

setting the confirmation information identification field of the initial sending status information to that the confirmation information has not been received to obtain first sending status information.

It should be noted that after the sending end sends a sub data packet to the receiving end, if the receiving end receives the sub data packet, it will return the corresponding confirmation information for the sub data packet to inform the sending end that the receiving end has received the sub data packet sent by the sending end. The confirmation information returned by the receiving end to the sending end may be ACK.

In actual applications, the data identification of the sub data packet may be recorded in the initial sending status information, and whether the confirmation information returned by the receiving end for the first sub data packet has been received may be recorded based on the confirmation information identification field. Specifically, after the sending end sends a sub data packet to the receiving end, the data identification of the first sub data packet may be determined, and the data identification of the first sub data packet may be set in the data identification field in the initial sending status information, and the confirmation information identification field of the initial sending status information is set to that the confirmation information has not been received, and the first sending status information is obtained. That is, the first sending status information may identify that the confirmation information returned by the receiving end for the first sub data packet has not been received.

In an optional implementation, the confirmation information identification field may be set to a first preset value (such as 1), representing that the confirmation information has been received, and the confirmation information identification field may be set to a second preset value (such as 0), representing that the confirmation information has not been received. In another optional implementation, the confirmation information identification field may be set to null, representing that the confirmation information has been received, and the confirmation information identification field may be set to a preset value (such as 0), representing that the confirmation information has not been received. Of course, other manners may also be used to set the confirmation information identification field of the initial sending status information to that the confirmation information has not been received, and this is not limited in the embodiments of the present specification.

It should be noted that after the sending end sends the first preset number of sub data packets to the receiving end, each sub data packet may be used as the first sub data packet, and then the data identification of the first sub data packet is determined, and the data identification of the first sub data packet is set in the data identification field of the initial sending status information, and the confirmation information identification field of the initial sending status information is set to that the confirmation information has not been received to obtain the first sending status information. In this way, for each sub data packet sent by the sending end to the receiving end, corresponding first sending status information may be generated, so as to record the sending status of the each sub data packet sent by the sending end and ensure a reliability of data transmission.

In an optional implementation of the embodiment, the corresponding field in the sending information maintenance table for constructing the association relationship may be determined according to a location of the first sub data packet in a sequence of arranging the first preset number of sub data packets sent by the sending end. That is, a specific implementation process for constructing the association relationship between the first sending status information and the corresponding field in the sending information maintenance table may be as follows:

determining a sequence number of the first sub data packet in the first preset number of sub data packets;

determining, according to the sequence number and the second preset number, a corresponding field number of the first sub data packet in the sending information maintenance table;

constructing an association relationship between the first sending status information and a field indicated by the field number in the sending information maintenance table.

It should be noted that sub data packets at different locations in the sequence in which the first preset number of sub data packets are arranged may be bound to different fields in the sending information maintenance table, so the sequence number of the first sub data packet in the first preset number of sub data packets may be determined first, and then the corresponding field number of the first sub data packet in the sending information maintenance table is determined based on the sequence number and the second preset number, and the association relationship between the first sending status information and the field indicated by the field number in the sending information maintenance table is constructed to bind the first sending status information and the field indicated by the field number in the sending information maintenance table.

In actual applications, the second preset number is a number of fields included in the sending information maintenance table, and it is also possible to preset which field of the sending information maintenance table should be bound to the corresponding sending status information of a sub data packet with which sequence number, that is, to preset a rule for determining the field number.

In a possible implementation, the sending status information of respective sub data packets may be bound to the fields in the sending information maintenance table in sequence. At this time, remainder of division of the sequence number by the second preset number can be calculated, and the obtained remainder is the corresponding field number of the first sub data packet in the sending information maintenance table. Subsequently, the association relationship between the first sending status information and the field indicated by the field number in the sending information maintenance table may be constructed.

As an example, the sending end sends 4 sub data packets to the receiving end, with the data identifications of 12, 13, 14, and 15 in sequence. A headmost sub data packet among the 4 sub data packets (that is, the sub data packet corresponding to data identification 12) is regarded as the first sub data packet, that is, the sequence number of the first sub data packet among the 4 sub data packets is 0, the second preset number is 4, remainder of division of the sequence number 0 by the second preset number 4 is calculated. At this time, the corresponding field number of the first sub data packet in the sending information maintenance table may be obtained as 0. At this time, the first sending status information of the first sub data packet: slot (12), may be bound to field 0 of the sending information maintenance table. When the second sub data packet among the 4 sub data packets (that is, the sub data packet corresponding to data identification 13) is regarded as the first sub data packet, that is, the sequence number of the first sub data packet among the 4 sub data packets is 1, the second preset number is 4, remainder of division of the sequence number 1 by the second preset number 4 is calculated. At this time, the corresponding field number of the first sub data packet in the sending information maintenance table may be obtained as 1. At this time, the first sending status information of the first sub data packet: slot (13), may be bound to field 1 of the sending information maintenance table. When the third sub data packet among the 4 sub data packets (that is, the sub data packet corresponding to data identification 14) is regarded as the first sub data packet, that is, the sequence number of the first sub data packet among the 4 sub data packets is 2, the second preset number is 4, remainder of division of the sequence number 2 by the second preset number 4 is calculated. At this time, the corresponding field number of the first sub data packet in the sending information maintenance table may be obtained as 2. At this time, the first sending status information of the first sub data packet: slot (14), may be bound to field 2 of the sending information maintenance table. When the fourth sub data packet among the 4 sub data packets (that is, the sub data packet corresponding to data identification 15) is regarded as the first sub data packet, that is, the sequence number of the first sub data packet among the 4 sub data packets is 3, the second preset number is 4, remainder of division of the sequence number 3 by the second preset number 4 is calculated. At this time, the corresponding field number of the first sub data packet in the sending information maintenance table may be obtained as 3. At this time, the first sending status information of the first sub data packet: slot (15), may be bound to field 3 of the sending information maintenance table. Thus, the sending status information of the 4 sub data packets sent by the sending end may be bound to the sending information maintenance table. At this time, each slot originally bound on the free slot has been used, and there is no empty slot, as shown in FIG. 2b. FIG. 2b is a schematic diagram of a second type of a sending information maintenance table provided by an embodiment of the present specification.

In an optional implementation of the embodiment, during constructing the association relationship between the first sending status information and the field indicated by the field number in the sending information maintenance table, the field indicated by the field number may already be associated with other sending status information. At this time, a specific implementation process for constructing the association relationship between the first sending status information and the field indicated by the field number in the sending information maintenance table may be as follows:

in a case that the field indicated by the field number is associated with third sending status information, jointly constructing an association relationship with the field indicated by the field number for the first sending status information and the third sending status information in series or in parallel, where the third sending status information is the sending status information corresponding to the sub data packet that has been sent to the receiving end but for which confirmation information returned by the receiving end has not been received.

It should be noted that if a certain field in the sending information maintenance table has been associated with the sending status information of a certain sub data packet before, but the confirmation information for the sub data packet returned by the receiving end has not been received, then the sending status information of the sub data packet remains to be associated with this field, but this will not affect the sending of subsequent sub data packets, that is, this field may continue to be associated with the sending status information of other sub data packets.

In actual applications, jointly constructing the association relationship with the field indicated by the field number for the first sending status information and the third sending status information in series or in parallel may refer to jointly binding the first sending status information and the third sending status information to the field indicated by the field number; or, since the third sending status information is bound to the field indicated by the field number, the first sending status information may continue to be bound to the third sending status information, that is, respective sending status information corresponding to the field number is bound in series in a link manner.

Following the above example, FIG. 2c is a schematic diagram of a third type of a sending information maintenance table provided by an embodiment of the present specification, assume that the first sending status information is slot (16), and the field number corresponding to slot (16) is 0, that is, it is necessary to associate slot (16) with field 0 in the sending information maintenance table shown in FIG. 2c. The field 0 is associated with slot (12), at this time, slot (16) may be continued to be associated with slot (12), as shown in FIG. 2c.

In the embodiments of the present specification, the sending end may know a current status of the each sub data packet based on the sending information maintenance table, thereby knowing which sub data packet has not been sent successfully. When a small amount of packet loss occurs, not only the sub data packets behind a packet loss point may be successfully sent to the receiving end, and but also subsequent sub data packets can be continued to be sent without affecting a subsequent bandwidth of the connection at all. That is, the loss of a certain sub data packet will not affect the sending of the subsequent sub data packets, avoiding head-of-line blocking, and it may be clearly known that which sub data packet is not sent successfully, a reliability of data transmission may be improved.

In an optional implementation of the embodiment, the sub data packet for which the confirmation information returned by the receiving end has not been received for a long time may be resent, that is, after the constructing the association relationship between the first sending status information and the field indicated by the field number in the sending information maintenance table, the method may further include:

determining whether the confirmation information returned by the receiving end for the first sub data packet is received within a preset time period;

if the confirmation information returned by the receiving end for the first sub data packet is not received within the preset time period, resending the first sub data packet to the receiving end.

Specifically, the preset time period may be a preset time interval for resending a sub data packet, such as 5 minutes, 10 minutes, etc.

It should be noted that if the sending end does not receive the confirmation information returned by the receiving end for the first sub data packet within the preset time period after sending the first sub data packet to the receiving end, it means that the first sub data packet may have been lost, and the receiving end has not received it, so the first sub data packet may be resent to the receiving end at this time.

In actual applications, when sending the first sub data packet to the receiving end, the sending end may record a sending time and start a timer. When the preset time is reached, the sending end may query in the sending information maintenance table to view whether a respective field is associated with the sending status information of the sub data packet, if the respective field is associated with the sending status information of the sub data packet, it means that the confirmation information returned by the receiving end for the first sub data packet has not been received, and at this time, the first sub data packet may be resent to the receiving end; if the respective field is not associated with the sending status information of the sub data packet, it means that the confirmation information returned by the receiving end for the first sub data packet has been received.

Of course, the sending end may also check whether each field in the sending information maintenance table is associated with sending status information every preset time period. If the each field in the sending information maintenance table is associated with the sending status information, the sending end may determine the sub data packet corresponding to respective associated sending status information, and then resend the sub data packet to the receiving end.

In the embodiments of the present specification, the sending end may know a current status of the each sub data packet based on the sending information maintenance table, thereby knowing which sub data packet has not been sent successfully. When a small amount of packet loss occurs, not only the sub data packets behind a packet loss point may be successfully sent to the receiving end, and but also subsequent sub data packets can be continued to be sent without affecting a subsequent bandwidth of the connection at all. That is, the loss of a certain sub data packet will not affect the sending of the subsequent sub data packets, avoiding head-of-line blocking. And it may be clearly known that which sub data packet is not sent successfully, and sub data packets that have not been sent successfully for a long time may be resent in time to avoid packet loss, which improves a reliability of data transmission.

Step 106, in a case that the confirmation information returned by the receiving end is received, determine a second sub data packet corresponding to the confirmation information, and determine second sending status information corresponding to the second sub data packet, and remove an association relationship between the second sending status information and a corresponding field in the sending information maintenance table, where the second sub data packet is a sub data packet for which the confirmation information is returned by the receiving end in the first preset number of sub data packets.

It should be noted that after sending the first preset number of sub data packets to the receiving end, the sending end may maintain the sending status of each sub data packet sent by the sending end based on the sending information maintenance table. In the case of the confirmation information returned by the receiving end is received, the sending end may determine the second sub data packet at which the received confirmation information is directed, the second sub data packet is a sub data packet sent by the sending end to the receiving end and successfully received by the receiving end.

In actual applications, when receiving a certain sub data packet, the receiving end may return the confirmation information for the sub data packet to the sending end. That is, the confirmation information returned by the receiving end may carry a data identification to inform the sending end which sub data packet has been received. Therefore, when receiving the confirmation information returned by the receiving end, the sending end may determine the second sub data packet corresponding to the confirmation information based on the data identification carried in the confirmation information, and the second sub data packet is the sub data packet that has been successfully received by the receiving end. Since the second sub data packet has been successfully received by the receiving end, its sending status does not need to continue to be maintained, at this time, the second sending status information corresponding to the second sub data packet may be determined, and the association relationship between the second sending status information and the corresponding field in the sending information maintenance table may be removed.

In the embodiments of the present specification, in a case that the confirmation information returned by the receiving end is received, the second sub data packet corresponding to the confirmation information may be determined, and the second sending status information corresponding to the second sub data packet may be determined, and the association relationship between the second sending status information and the corresponding field in the sending information maintenance table may be removed. In this way, only the sending status of each sub data packet for which confirmation information has not been received needs to be maintained in the sending information maintenance table, and there is no need to care the sending status of the sub data packet for which the confirmation information has been received. Thus, an amount of information that needs to be maintained is reduced and which sub data packet was not sent successfully may be clearly known, and a reliability of data transmission may be ensured.

In an optional implementation of the embodiment, after the removing the association relationship between the second sending status information and the corresponding field in the sending information maintenance table, the method may further include:

emptying data information filled in the second sending status information to obtain the initial sending status information, and setting the initial sending status information as an idle information table;

using a determined amount of the second sub data packet as the first preset number, continuing to return to an operation step of sending the first preset number of sub data packets to the receiving end, where the amount of the second sub data packet is less than or equal to an initial first preset number.

It should be noted that the determined second sub data packet is the sub data packet that the receiving end successfully receives and for which the receiving end successfully returns confirmation information to the sending end, the sending end does not need to continue caring the sending status of the second sub data packet, so the association relationship between the second sending status information and the corresponding field in the sending information maintenance table may be removed, and the data information filled in the second sending status information may be emptied to obtain the initial sending status information, and recording of the data information of other sub data packets sent by the sending end may be continued by using the initial sending status information, and the initial sending status information set initially may be recycled to reduce a resource consumption.

In actual applications, the number of pieces of the initial sending status information which is preset and with empty content is the first preset number, the sending status of each sub data packet in the first preset number of sub data packets sent to the receiving end is recorded correspondingly. At this time, all pieces of initial sending status information is used, and there is no idle initial sending status information. After the confirmation information is received, the association relationship between the second sending status information of the second sub data packet corresponding to the confirmation information and the corresponding field in the sending information maintenance table may be removed, and the data information of the second sub data packet recorded in the second sending status information may be emptied. At this time, the idle initial sending status information may be obtained, and the amount of second sub data packet is the number of pieces of idle initial sending status information re-obtained. At this time, the corresponding amount of sub data packet may be continued to be sent, the sending status information of the sub data packet sent by the receiving end is continued to be recorded through the idle initial sending status information. That is to say, the determined amount of the second sub data packet is the number of pieces of idle initial sending status information, and is also the amount of the sub data packet that may be continued to be sent at this time point, the amount cannot be greater than the number of the pieces of initial sending status information (that is, the initial first preset number) set initially, so the determined amount of the second sub data packet may be used as the first preset number, and a return to an operation step of sending the first present number of sub data packets to the receiving end may be continued to be performed.

For example, as shown in FIG. 2b, assume that three pieces of confirmation information is received, corresponding to sub data packets with data identifications of 13, 14, and 15 respectively. At this time, the association relationship between slot (13), slot (14), and slot (15) and the corresponding fields in the sending information maintenance table may be removed, and the data information recorded in slot (13), slot (14) and slot (15) may be emptied, 3 empty slots are obtained, and the 3 empty slots are bound to the free slot, as shown in FIG. 2d, which is a schematic diagram of a fourth type of a sending information maintenance table provided by an embodiment of the present specification.

At this time, the amount of the second sub data packet is 3, that is, 3 empty slots are obtained, the first preset number is 3, and the sending end may continue sending 3 sub data packets to the receiving end, for example, the sub data packets to the receiving end, for example, the sub data packets with the data identification of 16, 17 and 18. The headmost sub data packet among the 3 sub data packets (that is, the sub data packet corresponding to data identification 16) is regarded as the first sub data packet, that is, the sequence number of the first sub data packet among the 3 sub data packets is 0, the second preset number is 4, remainder of division of the sequence number 0 by the second preset number 4 is calculated. At this time, the corresponding field number of the first sub data packet in the sending information maintenance table may be obtained as 0. At this time, the first sending status information of the first sub data: slot (16), may be bound to field 0 of the sending information maintenance table. Based on the above method, it is sequentially determined that slot (17) is bound to field 1 of the sending information maintenance table and slot (18) is bound to field 2 of the sending information maintenance table, as shown in FIG. 2e. FIG. 2e is a schematic diagram of a fifth type of a sending information maintenance table provided by an embodiment of the present specification.

Assume that two pieces of confirmation information are received, corresponding to sub data packets with data identifications of 12 and 16 respectively. At this time, the association relationship between slot (12) and slot (16) and the corresponding fields in the sending information maintenance table may be removed, and the data information recorded in slot (12) and slot (16) may be emptied, 2 empty slots are obtained, and the 2 empty slots are bound to the free slot, as shown in FIG. 2f, which is a schematic diagram of a sixth type of a sending information maintenance table provided by an embodiment of the present specification. At this time, the amount of the second sub data packet is 2, that is, 2 empty slots are obtained, the first preset number is 2, the sending end may continue sending 2 sub data packets to the receiving end, for example, the sub data packets with the data identification of 19, 20. Based on the above method, it may be determined that slot (19) is bound to field 0 of the sending information maintenance table, and slot (20) is bound to field 1 of the sending information maintenance table, as shown in FIG. 2g. FIG. 2g is a schematic diagram of a seventh type of a sending information maintenance table provided by an embodiment of the present specification.

An embodiment of the present specification provides a data transmission method, after sending sub data packets to the receiving end, the sending end can maintain, based on the sending information maintenance table, a sending status of each sub data packet sent by the sending end, and the receiving end receives the respective sub data packets without a need to have such receiving be performed in a particular sequence. The receiving end may return confirmation information for a sub data packet to the sending end after the sub data packet is received by the receiving end. After the sending end receives the confirmation information returned by the receiving end, it means that the sub data packet is sent successfully. At this time, an association relationship between sending status information corresponding to the sub data packet and the corresponding field in the sending information maintenance table may be removed, and there is no need to continue caring the sending status of the sub data packet. In this way, the sending end may know a current status of the each sub data packet based on the sending information maintenance table, thereby knowing which sub data packet has not been sent successfully. When a small amount of packet loss occurs, not only the sub data packets behind a packet loss point may be successfully sent to the receiving end, but also subsequent sub data packets can be continued to be sent without affecting a subsequent bandwidth of the connection at all. That is, the loss of a certain sub data packet will not affect the sending of the subsequent sub data packets, avoiding head-of-line blocking, and it may be clearly known that which sub data packet is not sent successfully, a reliability of data transmission may be improved.

Referring to FIG. 3, FIG. 3 shows a flow chart of another data transmission method provided by an embodiment of the present specification, which is applied to a receiving end and specifically includes the following steps.

Step 302, receive a third sub data packet, and acquire a target data identification of the third sub data packet.

It should be noted that the third sub data packet is a sub data packet received by the receiving end and sent by a sending end. After receiving the third sub data packet, the receiving end may acquire the target data identification carried in the third sub data packet. Subsequently, the receiving end may determine whether the third sub data packet has been received before, whether its receiving status has been recorded, etc. based on the target data identification, thereby determining a manner of an information recording and reporting for the third sub data packet.

In an embodiment of the present specification, a current maximum to-be-received data identification and a sequential to-be-received data identification may be preset. Through these two identifications, it may be determined whether the third sub data packet has been received before, and whether its receiving status has been recorded, etc. The current maximum to-be-received data identification is a next data identification of a maximum data identification received currently, and the sequential to-be-received data identification is a data identification of a next sub data packet to be received in sequence. In a case that no sub data packet is received, both the current maximum to-be-received data identification and the sequential to-be-received data identification may be initialized to 0.

In an optional implementation of the embodiment, the current maximum to-be-received data identification and the sequential to-be-received data identification may be updated according to the data identification of the sub data packet that has been received, that is, after the receiving the third sub data packet, and acquiring the target data identification of the third sub data packet, the method may further include:

incrementing a first data identification by 1 to serve as the current maximum to-be-received data identification, where the first data identification is a data identification of a sub data packet having a maximum data identification among respective sub data packets received currently;

incrementing a second data identification by 1 to serve as a sequential to-be-received data identification, where the second data identification is the data identification of a sub data packet having the maximum data identification among the sub data packets received currently before which there is no sub data packet that has not been received, and the sequential to-be-received data identification is a data identification of a next sub data packet to be received in sequence.

It should be noted that the current maximum to-be-received data identification is a data identification of a next to-be-received sub data packet after a sub data packet having the maximum data identification among the currently received sub data packets, and the sequential to-be-received data identification is a data identification of a next to-be-received sub data packet in accordance with a sequence of the sub data packets. Thus, the maximum data identification among the sub data packets received currently incremented by 1 serves as the current maximum to-be-received data identification, and the data identification of the sub data packet having the maximum data identification among the sub data packets received currently before which there is no sub data packet that has not been received incremented by 1 serves as the sequential to-be-received data identification.

As an example, FIG. 4 is a schematic diagram of a receiving information maintenance table provided by an embodiment of the present specification. As shown in FIG. 4, in an initial state, a receiving end does not receive any sub data packet, and a sequential to-be-received data identification is recv_next=0, a current maximum to-be-received data identification is recv_max=0. Assume that the data identifications of the received sub data packets are 1, 2, 3, 4, at this time, a data identification of the sub data packet having a maximum data identification among the sub data packets received currently before which there is no sub data packet that has not been received is 4, so sequential to-be-received data identification is recv_next=5; the data identification of the sub data packet having the maximum data identification among the sub data packets received currently is also 4, so the current maximum to-be-received data identification is also recv_max=5. Afterwards, a data identification of a received sub data packet is 8, at this time, since the sub data packets with data identifications of 5, 6, 7 have not been received, so the data identification of the sub data packet having the maximum data identification among the sub data packets received currently before which there is no sub data packet that has not been received is still 4, that is, the sequential to-be-received data identification is still recv_next=5; the maximum data identification among the sub data packets received currently is 8, so the current maximum to-be-received data identification is recv_max=9. Afterwards, a data identification of a received sub data packet is 6; at this time, since the sub data packet with the data identification of 5 has not been received, so the data identification of the sub data packet having the maximum data identification among the sub data packets received currently before which there is no sub data packet that has not been received is still 4, and at this time, the sequential to-be-received data identification is still recv_next=5; the maximum data identification among the sub data packets received currently is still 8, so the current maximum to-be-received data identification is still recv_max=9. Afterwards, a data identification of a received sub data packet is 10; at this time, since the sub data packets with data identifications of 5, 7, 9 have not been received, so the maximum data identification among the sub data packets received currently before which there is no sub data packet that has not been received is still 4, and at this time, the sequential to-be-received data identification is still recv_next=5; the maximum data identification among the sub data packets received currently is 10, so the current maximum to-be-received data identification at this time is recv_max=11.

Step 304, in a case that the target data identification is greater than a current maximum to-be-received data identification, determine, according to the target data identification, a fourth sub data packet that has not been received before the third sub data packet, where the current maximum to-be-received data identification is a next data identification of a maximum data identification received currently.

It should be noted that in the case that the target data identification is greater than the current maximum to-be-received data identification, it means that the third sub data packet received currently is the sub data packet received currently with the maximum data identification. At this time, the fourth sub data packet that has not been received before the third sub data packet is determined according to the target data identification. For the fourth sub data packet that has not been received, a corresponding receiving status may be recorded to ensure a reliability of data transmission.

In actual applications, during determining the fourth sub data packet that has not been received before the third sub data packet according to the target data identification, the receiving status information of the sub data packets that have not been received before the sub data packet having the current maximum to-be-received data identification have already been recorded, and there is no need to record it again, so at this time, the sub data packet has not been received between the current maximum to-be-received data identification and the third sub data packet may be used as the fourth sub data packet. As an example, the current maximum to-be-received data identification is 9, and the data identification of the third sub data packet is 10, at this time, the fourth sub data packet is the sub data packet that has not been received between 9 and 10, that is, the sub data packet with the data identification 9.

Step 306, set data information of the fourth sub data packet in initial receiving status information to obtain first receiving status information, and construct an association relationship between the first receiving status information and a corresponding field in a receiving information maintenance table, where the receiving information maintenance table includes a third preset number of fields.

Specifically, the initial receiving status information is a receiving status recording structure that is preset and with empty content; the first receiving status information is information recording a receiving status of the fourth sub data packet. The receiving information maintenance table may be a recording table that is preset and can maintain the receiving status of each sub data packet. For example, the receiving information maintenance table may be a hash table including the third preset number of fields, where the third preset number may be a number of fields which is preset and included in the receiving information maintenance table. The third preset number may be the same as or different from the second preset number and the first preset number. For example, the third preset number may be 4, 8, 16, etc.

It should be noted that after the data information of the fourth sub data packet is recorded in the initial receiving status information, the first receiving status information recording the receiving status of the fourth sub data packet can be obtained. The association relationship between the first receiving status information and the corresponding field in the receiving information maintenance table is constructed to maintain the receiving status of each sub data packet through the receiving information maintenance table. Specifically, the constructing the association relationship between the first receiving status information and the corresponding field in the receiving information maintenance table may be that the first receiving status information is bound to the corresponding field in the receiving information maintenance table, then the first receiving status information bound on the respective field in the receiving information maintenance table may be viewed subsequently.

In an optional implementation of the embodiment, before the data information of the fourth sub data packet is recorded, multiple pieces of initial receiving status information with empty content may also be preset, that is, before setting the data information of the fourth sub data packet in the initial receiving status information to obtain the first receiving status information, the method may further include:

presetting a fourth preset number of pieces of initial receiving status information with empty content;

setting each piece of initial receiving status information as an idle information table.

It should be noted that the initial receiving status information is of a structure that is preset and may record the information of sub data packet that has not been received. For example, the initial receiving status information is a slot (slot) that may record information, so the fourth preset number of pieces of initial receiving status information with empty content may be preset. The fourth preset number may be preset as a number of pieces of initial receiving status information, and the fourth preset number may be the same as or different from the third preset number, the second preset number, and the first preset number, for example, the fourth preset number value may be 4, 8, 16, etc.

In actual applications, when the respective initial receiving status information is set as the idle information table, the association relationship between the respective initial receiving status information and the idle information table may be constructed, that is, the respective initial receiving status information is bound to the idle information table.

In the embodiments of the present specification, the fourth preset number of pieces of initial receiving status information with empty content may be preset, and each piece of initial receiving status information may be set as the idle information table, and the data information of each sub data packet that should have been received in sequence but has not been received may be set in the initial receiving status information subsequently to record status information of the each sub data packet that has not been received, and improve a reliability of data transmission.

In an optional implementation of the embodiment, the initial receiving status information includes a data identification field and a receiving information identification field, and the receiving information identification field is used to identify whether a sub data packet sent by a sending end is received, a specific implementation process for setting the data information of the fourth sub data packet in the initial receiving status information to obtain the first receiving status information may be as follows:

determining a data identification of the fourth sub data packet, and setting the data identification of the fourth sub data packet for the data identification field in the initial receiving status information;

setting the receiving information identification field of the initial receiving status information to: not received, to obtain the first receiving status information.

It should be noted that the data identification of the sub data packet may be recorded in the initial receiving status information, and whether the corresponding sub data packet is received may also be recorded based on the receiving information identification field. Specifically, after the fourth sub data packet that has not been received before the third sub data packet is determined, the data identification of the fourth sub data packet may be determined, and the data identification of the fourth sub data packet may be set in the data identification field in the initial receiving status information, and the receiving information identification field of the initial receiving status information is set to: not received, and the first receiving status information is obtained. That is, the first receiving status information may identify that the corresponding sub data packet has not been received.

In an optional implementation, the receiving information identification field may be set to a first preset value (such as 1), representing that the corresponding sub data packet has been received, and the receiving information identification field may be set to a second preset value (such as 0), representing that the corresponding sub data packet has not been received. In another optional implementation, the receiving information identification field may be set to null, representing that the corresponding sub data packet has been received, and the receiving information identification field may be set to a preset value (such as 0), representing that the corresponding sub data packet has not been received. Of course, other manners may also be used to set the receiving information identification field of the initial receiving status information to: not received, and this is not limited in the embodiments of the present specification.

It should be noted that after the fourth sub data packet that has not been received before the third sub data packet is determined, the data identification of the fourth sub data packet may be determined, and the data identification of the fourth sub data packet may be set in the data identification field in the initial receiving status information, and the first receiving status information may be obtained. In this way, the receiving end may record, based on the receiving status information, the status information of each sub data packet that should have been received but has not received, thereby ensuring the reliability of data transmission.

In an optional implementation of the embodiment, the constructing the association relationship between the first receiving status information and the corresponding field in the receiving information maintenance table including:

determining a field number corresponding to the data identification of the fourth sub data packet in the receiving information maintenance table;

constructing an association relationship between the first receiving status information and a field indicated by the field number in the receiving information maintenance table.

In actual applications, the receiving information maintenance table includes a starting identification and an ending identification. The starting identification may be a position identification corresponding to a fourth sub data packet at a top of the sequence of fourth sub data packets unreceived before the third sub data packet received in a current round in the receiving information maintenance table. The ending identification may be a position identification corresponding to a fourth sub data packet at a top of the sequence of fourth sub data packets unreceived before the third sub data packet received in a next round in the receiving information maintenance table, that is, the ending identification is the starting identification of the next round. According to the starting identification and the ending identification included in the receiving information maintenance table, the field number corresponding to the data identification of each fourth sub data packet in the receiving information maintenance table may be determined.

As an example, as shown in FIG. 4, assume that the receiving end receives sub data packets with data identifications of 1, 2, 3, 4. At this time, the starting identification in the receiving information maintenance table is field 0, and the sub data packets 1, 2, 3, 4 correspond to fields 0, 1, 2, 3 in the receiving information maintenance table respectively. The starting identification of the next round is still field 0, that is, the ending identification is also field 0, and before the sub data packet with the data identification of 4, there is no sub data packet that has not been received. Afterwards, the sub data packet with data identification of 8 is received. At this time, the starting identification and ending identification in the receiving information maintenance table are still field 0, the sub data packets 5, 6, 7, and 8 correspond to fields 0, 1, 2, 3 in the receiving information maintenance table respectively. Since the sub data packets with the data identifications of 5, 6, 7 have not been received, the sub data packets with the data identifications of 5, 6, 7 are the fourth sub data packets at this time. Based on the above method, the first receiving status information corresponding to the sub data packets with data identifications of 5, 6 and 7: slot (5), slot (6) and slot (7) may be obtained in sequence, and the slot (5), slot (6) and slot (7) are respectively associated with fields 0, 1, 2 in the receiving information maintenance table, as shown in FIG. 4.

In an optional implementation of the embodiment, during constructing the association relationship between the first receiving status information and the field indicated by the field number in the receiving information maintenance table, the field indicated by the field number may have been associated with other receiving status information. At this time, a specific implementation process for constructing the association relationship between the first receiving status information and the field indicated by the field number in the receiving information maintenance table may be as follows:

in a case that the field indicated by the field number is associated with the third receiving status information, jointly construct an association relationship with the field indicated by the field number for the first receiving status information and the third receiving status information in series or in parallel, where the third receiving status information is receiving status information corresponding to a sub data packet that has not been received.

It should be noted that if a certain field in the receiving information maintenance table has been associated with the receiving status information of a certain sub data packet before, but the corresponding sub data packet has not been received yet, then the receiving status information of the sub data packet remains to be associated with this field, but this will not affect the receiving of subsequent sub data packets, that is, this field may continue to be associated with the receiving status information of other sub data packets.

In actual applications, jointly constructing the association relationship with the field indicated by the field number for the first receiving status information and the third receiving status information in series or in parallel may refer to jointly binding the first receiving status information and the third receiving status information to the field indicated by the field number; or, since the third receiving status information is bound to the field indicated by the field number, the first receiving status information may continue to be bound to the third receiving status information, that is, respective receiving status information corresponding to the field number is bound in series in a link manner.

In an optional implementation of the embodiment, after the target data identification carried in the third sub data packet is acquired, whether the third sub data packet has been received and whether its receiving status has been recorded before may be first determined based on the target data identification, to determine a manner of an information recording and reporting for the third sub data packet. That is, based on the target data identification, it is determined whether to perform determination and recording of the receiving status information of the sub data packet that has not been received before. That is to say, after receiving the third sub data packet, and acquiring the target data identification of the third sub data packet, the method may further include:

determining whether the target data identification is smaller than the sequential to-be-received data identification;

in a case that the target data identification is smaller than the sequential to-be-received data identification, determining that the third sub data packet is a sub data packet that has been received and has been reported.

In actual applications, after receiving a sub data packet, the receiving end may report the sub data packet to an application layer, and the receiving end may return confirmation information to a sending end after receiving the sub data packet. At this time, a receiving process for this sub data packet is completed, and there is no need to continue maintaining a receiving status of this sub data packet, that is, the receiving end may not be able to query relevant information of this sub data packet based on the receiving information maintain table subsequently. However, although the receiving end returns the confirmation information to the sending end, the sending end may fail to receive it, so the sending end may repeatedly send this sub data packet, and if the receiving end receives the same sub data packet again subsequently, this may result in repeating reporting to the application layer, which leads to data confusion. Therefore, a sequential to-be-received data identification is set in the embodiment of the present specification, and a second data identification is the data identification of the sub data packet having a maximum data identification among the sub data packets received currently before which there is no sub data packet that has not been received, that is, the sequential to-be-received data identification is a data identification of a next sub data packet to be received in sequence. That is to say, the sub data packets corresponding to the data identifications before the sequential to-be-received data identification have all been received and reported to the application layer.

It should be noted that after the target data identification of the third sub data packet is acquired, it may be first determined whether the target data identification is smaller than the sequential to-be-received data identification, and in a case that the target data identification is smaller than the sequential to-be-received data identification, the third sub data packet being a sub data packet that has been received and has been reported is determined. At this time, there is no need to report the third sub data packet again, and what is only needed is to return the confirmation information to the sending end, which avoids repeated reporting and ensures the reliability of data transmission.

Following the above example, assume that the sequential to-be-received data identification is recv_next=5, and the target data identification of the received third sub data packet is 3. Since 3 is smaller than the sequential to-be-received data identification of 5, at this time, it may be determined that the third sub data packet is a sub data packet that has been received and reported, the third sub data packet will not be reported and only the confirmation information will be returned to the sending end. In an optional implementation of the embodiment, after determining whether the target data identification is smaller than the sequential to-be-received data identification, the method may further include:

in a case that the target data identification is not smaller than the sequential to-be-received data identification, determining whether the target data identification is greater than the current maximum to-be-received data identification;

if the target data identification is not greater than the current maximum to-be-received data identification, removing an association relationship between a second receiving status information corresponding to the third sub data packet and a corresponding field in the receiving information maintenance table, and reporting the third sub data packet to an application layer.

It should be noted that if the target data identification is greater than the current maximum to-be-received data identification, that is, when the sub data packet whose data identification is greater than the current maximum to-be-received data identification is received, it means that there is the fourth sub data packet that has not been received before the sub data packet. At this time, operation steps of steps 304-306 may be performed to record the receiving status information of the fourth sub data packet that has not been received before the third sub data packet to mark that the fourth sub data packet sent by the sending end has not been received. If the data identification of the received third sub data packet is not greater than the current maximum to-be-received data identification, that is, this data identification is between the sequential to-be-received data identification and the current maximum to-be-received data identification, it means that the receiving status information of the third sub data packet has been recorded before, and the receiving status information of the third sub data packet has been associated with the receiving information maintenance table. At this time, the association relationship between the second receiving status information corresponding to the third sub data packet and the corresponding field in the receiving information maintenance table may be removed, which means that the third sub data packet has been received, the corresponding confirmation information is returned to the sending end, and the third sub data packet is reported to the application layer.

In an optional implementation of the embodiment, after removing the association relationship between the second receiving status information corresponding to the third sub data packet and the corresponding field in the receiving information maintenance table, the method may further include:

emptying data information filled in the second receiving status information to obtain the initial receiving status information, and setting the initial receiving status information as an idle information table.

It should be noted that, at this time, the third sub data packet is a sub data packet that the receiving end successfully receives and for which the receiving end successfully returns confirmation information to the sending end, the receiving end does not need to continue caring the receiving status of the third sub data packet, so the association relationship between the second receiving status information and the corresponding field in the receiving information maintenance table may be removed, and the data information filled in the second receiving status information may be emptied to obtain the initial receiving status information, the initial receiving status information may be used to continue recording data information of other sub data packets that have not been received. The initial receiving status information set initially may be recycled to reduce a resource consumption.

Following the above example, as shown in FIG. 4, the receiving end receives sub data packets with data identifications of 1, 2, 3, 4, and returns the confirmation information for the sub data packets with the data identifications of 1, 2, 3, 4 to the sending end, and reports the sub data packets with the data identifications of 1, 2, 3, 4 to the application layer. At this time, recv_next=5, recv_max=5, the starting identification and the ending identification in the receiving information maintenance table both correspond to field 0.

Afterwards, the receiving end receives a sub data packet with a data identification of 8, at this time, confirmation information for the sub data packet with the data identification of 8 may be returned to the sending end, and the sub data packet with the data identification of 8 may be reported to the application layer. Since 8 is greater than recv_max=5, at this time, it may be determined that sub data packets that have not been received before the sub data packet with data identification of 8 are sub data packets with data identifications of 5, 6, 7. At this time, the following can be sequentially determined: the data information of the sub data packet with the data identification of 5 may be set in the initial receiving status information and the first receiving status information corresponding to the sub data packet with the data identification of 5: slot (5), is obtained; the data information of the sub data packet with the data identification of 6 may be set in the initial receiving status information and the first receiving status information corresponding to the sub data packet with the data identification of 6: slot (6), is obtained; the data information of the sub data packet with the data identification of 7 may be set in the initial receiving status information and the first receiving status information corresponding to the sub data packet with the data identification of 7: slot (7), is obtained. And slot (5), slot (6), and slot (7) are associated with fields 0, 1, 2 in the receiving information maintenance table in sequence. Moreover, at this time, recv_next=5, recv_max=9, and the starting identification and the ending identification in the receiving information maintenance table both correspond to field 0.

Afterwards, a sub data packet with a data identification of 6 is received, since 6 is greater than recv_next=5 and less than recv_max=9, it can be determined at this time that the corresponding field of the sub data packet with data identification of 6 in the receiving information maintenance table is field 1, the association relationship between the receiving status information corresponding to the sub data packet with the data identification of 6: slot (6), and field 1 in the receiving information maintenance table is removed, and the confirmation information corresponding to the sub data packet with the data identification of 6 is returned to the sending end, and the sub data packet with the data identification of 6 is reported to the application layer. At this time, recv_next=5, recv_max=9, and the starting identification and the ending identification in the receiving information maintenance table both correspond to field 0.

Afterwards, a sub data packet with a data identification of 10 is received. At this time, the confirmation information for the sub data packet with the data identification of 10 may be returned to the sending end, and the sub data packet with the data identification of 10 may be reported to the application layer. Since 10 is greater than recv_max=9, at this time, it may be determined that the sub data packet that has not received before the sub data packet with the data identification of 10 and after the sub data packet with the data identification of 8 is the sub data packet with the data identification of 9. At this time, the data information of the sub data packet with the data identification of 9 may be set in the initial receiving status information, the first receiving status information corresponding to the sub data packet with the data identification of 9: slot (9), may be obtained, and slot (9) may be associated with field 0 in the receiving information maintenance table. Moreover, at this time, recv_next=5, recv_max=11, the starting identification in the receiving information maintenance table is indicated by field 0, and the ending identification corresponds to field 2, that is, the subsequent sub data packet with the data identification of 11 corresponds to field 2 in the receiving information maintenance table.

An embodiment of the present specification provides a data transmission method, after receiving a third sub data packet, a receiving end may acquire a target data identification of the third sub data packet, and determine a recording manner subsequently for the third sub data packet based on the target data identification. In a case that the target data identification is greater than a current maximum to-be-received data identification, the receiving end may determine, according to the target data identification, the fourth sub data packet that has not been received before the third sub data packet, and maintain, based on the receiving information maintenance table, a receiving status of each fourth sub data packet which should have been received in accordance with the sequence but has not been received in fact, thereby knowing which sub data packet has not been received successfully. When a small amount of packet loss occurs, not only the sub data packets behind a packet loss point may be successfully received and reported to an application layer, but also subsequent sub data packets can be continued to be received without affecting a subsequent bandwidth of the connection at all. That is, the loss of a certain sub data packet will not affect the receiving and reporting of the subsequent sub data packets, avoiding head-of-line blocking, and it may be clearly known that which sub data packet is not received successfully, and a reliability of data transmission may be improved.

Figure 5:
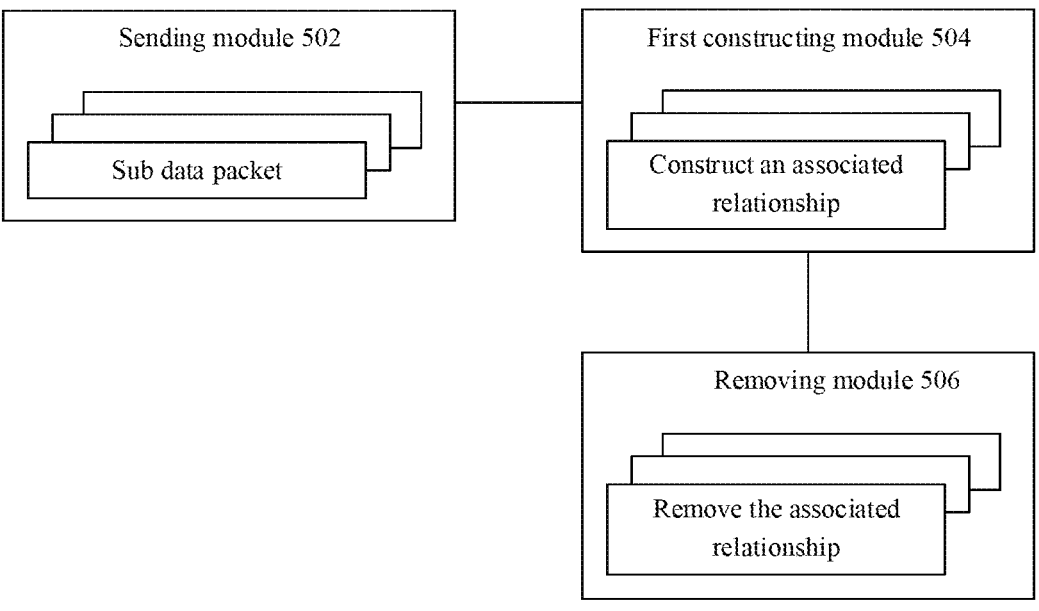
FIG. 5 is a schematic structural diagram of a data transmission apparatus provided by an embodiment of the present specification.

Corresponding to the above method embodiments, the present specification also provides an embodiment of a data transmission apparatus. FIG. 5 shows a schematic structural diagram of a data transmission apparatus provided by an embodiment of the present specification, which is applied to a sending end. As shown in FIG. 5, the apparatus includes:

a sending module 502, configured to send first preset number of sub data packets to a receiving end;

a first constructing module 504, configured to: set data information of a first sub data packet in initial sending status information to obtain first sending status information, and construct an association relationship between the first sending status information and a corresponding field in a sending information maintenance table, where the sending information maintenance table includes a second preset number of fields, and the first sub data packet is any sub data packet in the first preset number of sub data packets;

a removing module 506, configured to: in a case that confirmation information returned by the receiving end is received, determine a second sub data packet corresponding to the confirmation information, and determine second sending status information corresponding to the second sub data packet, and remove an association relationship between the second sending status information and a corresponding field in the sending information maintenance table, where the second sub data packet is a sub data packet for which the confirmation information is returned by the receiving end in the first preset number of sub data packets.

Optionally, the apparatus further includes a first setting module configured to:

split a to-be-transmitted data packet into at least two sub data packets;

set a starting data identification for a headmost sub data packet among the at least two sub data packets;

set, according to the starting data identification, a corresponding data identification for a sub data packet following the headmost sub data packet in the at least two sub data packets.

Optionally, the initial sending status information includes a data identification field and a confirmation information identification field, and the confirmation information identification field is used to identify whether confirmation information returned by the receiving end for the first sub data packet has been received;

the first constructing module 504 is further configured to:

determine a data identification of the first sub data packet, and set the data identification of the first sub data packet for the data identification field in the initial sending status information;

set the confirmation information identification field of the initial sending status information to that the confirmation information has not been received to obtain first sending status information.

Optionally, the apparatus further includes a second setting module configured to:

preset the first preset number of pieces of initial sending status information with empty content;

set each piece of initial sending status information as an idle information table.

Optionally, the first constructing module 504 is further configured to:

determine a sequence number of the first sub data packet in the first preset number of sub data packets;

determine, according to the sequence number and the second preset number, a corresponding field number of the first sub data packet in the sending information maintenance table;

construct an association relationship between the first sending status information and a field indicated by the field number in the sending information maintenance table.

Optionally, the first constructing module 504 is further configured to:

in a case that the field indicated by the field number is associated with third sending status information, jointly construct an association relationship with the field indicated by the field number for the first sending status information and the third sending status information in series or in parallel, where the third sending status information is the sending status information corresponding to the sub data packet that has been sent to the receiving end but for which confirmation information returned by the receiving end has not been received.

Optionally, the apparatus further includes an emptying module configured to:

empty data information filled in the second sending status information to obtain the initial sending status information, and set the initial sending status information as an idle information table;

use a determined amount of the second sub data packet as the first preset number, continue to return to the step executed by the sending module 502, where the amount of the second sub data packet is less than or equal to an initial first preset number.

Optionally, the apparatus further includes a resending module configured to:

determine whether the confirmation information returned by the receiving end for the first sub data packet is received within a preset time period;

if the confirmation information returned by the receiving end for the first sub data packet is not received within the preset time period, resend the first sub data packet to the receiving end.

An embodiment of the present specification provides a data transmission apparatus. After sending sub data packets to the receiving end, the sending end can maintain, based on the sending information maintenance table, a sending status of each sub data packet sent by the sending end, and the receiving end receives the respective sub data packets without a need to have such receiving be performed in sequence. The receiving end may return confirmation information for a sub data packet to the sending end after the sub data packet is received by the receiving end. After the sending end receives the confirmation information returned by the receiving end, it means that the sub data packet is sent successfully. At this time, an association relationship between sending status information corresponding to the sub data packet and the corresponding field in the sending information maintenance table may be removed, and there is no need to continue caring the sending status of the sub data packet. In this way, the sending end may know a current status of the each sub data packet based on the sending information maintenance table, thereby knowing which sub data packet has not been sent successfully. When a small amount of packet loss occurs, not only the sub data packets behind a packet loss point may be successfully sent to the receiving end, but also subsequent sub data packets can be continued to be sent without affecting a subsequent bandwidth of the connection at all. That is, the loss of a certain sub data packet will not affect the sending of the subsequent sub data packets, avoiding head-of-line blocking, and it may be clearly known that which sub data packet is not sent successfully, a reliability of data transmission may be improved.

The above is a schematic solution of the data transmission apparatus in the embodiment. It should be noted that the technical solution of the data transmission apparatus and the technical solution of the above data transmission method belong to the same concept. For detail contents that are not described in detail in the technical solution of the data transmission apparatus, reference may be made to the description of the technical solution of the above data transmission method.

Figure 6:
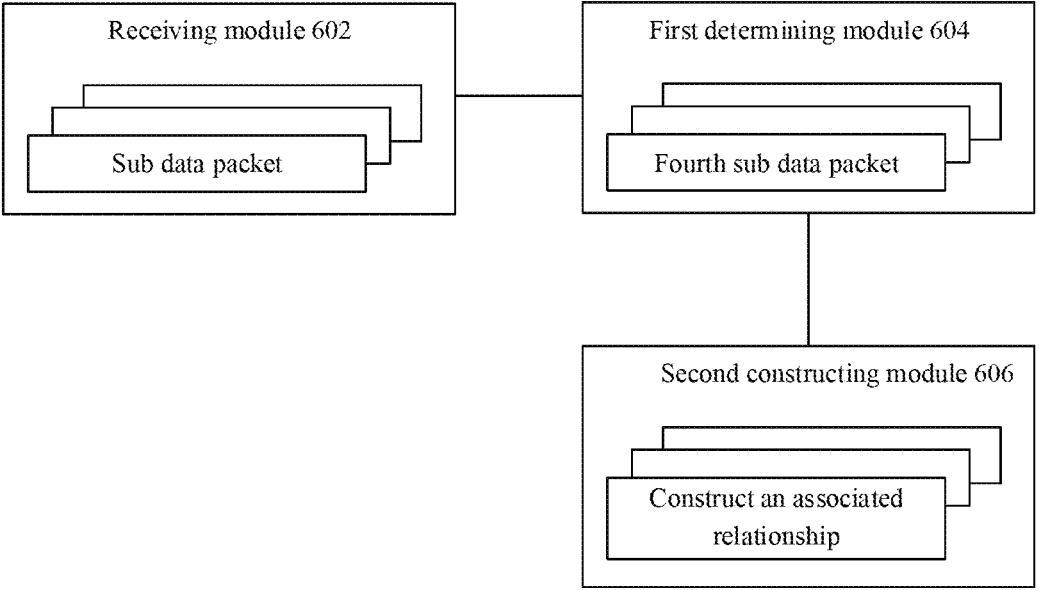
FIG. 6 is a schematic structural diagram of another data transmission apparatus provided by an embodiment of the present specification.

Corresponding to the above method embodiments, the present specification further provides an embodiment of a data transmission apparatus. FIG. 6 shows a schematic structural diagram of another data transmission apparatus provided by an embodiment of the present specification, which is applied to a receiving end. As shown in FIG. 6, the apparatus includes:

a receiving module 602, configured to receive a third sub data packet, and acquire a target data identification of the third sub data packet;

a first determining module 604, configured to: in a case that the target data identification is greater than a current maximum to-be-received data identification, determine, according to the target data identification, a fourth sub data packet that has not been received before the third sub data packet, where the current maximum to-be-received data identification is a next data identification of a maximum data identification received currently;

a second constructing module 606, configured to: set data information of the fourth sub data packet in initial receiving status information to obtain first receiving status information, and construct an association relationship between the first receiving status information and a corresponding field in a receiving information maintenance table, where the receiving information maintenance table includes a third preset number of fields.

Optionally, the apparatus further includes a increment module configured to:

increment a first data identification by 1 to serve as the current maximum to-be-received data identification, where the first data identification is a data identification of a sub data packet having a maximum data identification among respective sub data packets received currently;

increment a second data identification by 1 to serve as a sequential to-be-received data identification, where the second data identification is the data identification of a sub data packet having the maximum data identification among the sub data packets received currently before which there is no sub data packet that has not been received, and the sequential to-be-received data identification is a data identification of a next sub data packet to be received in sequence.

Optionally, the apparatus further includes a second determining module configured to:

determine whether the target data identification is smaller than the sequential to-be-received data identification;

in a case that the target data identification is smaller than the sequential to-be-received data identification, determine that the third sub data packet is a sub data packet that has been received and has been reported.

Optionally, the second determining module is further configured to:

in a case that the target data identification is not smaller than the sequential to-be-received data identification, determine whether the target data identification is greater than the current maximum to-be-received data identification;

if the target data identification is not greater than the current maximum to-be-received data identification, remove an association relationship between a second receiving status information corresponding to the third sub data packet and a corresponding field in the receiving information maintenance table, and report the third sub data packet to an application layer.

Optionally, the second determining module is further configured to:

empty data information filled in the second receiving status information to obtain the initial receiving status information, and set the initial receiving status information as an idle information table.

Optionally, the initial receiving status information includes a data identification field and a receiving information identification field, and the receiving information identification field is used to identify whether a sub data packet sent by a sending end is received;

the second constructing module 606 is further configured to:

determine a data identification of the fourth sub data packet, and set the data identification of the fourth sub data packet for the data identification field in the initial receiving status information;

set the receiving information identification field of the initial receiving status information to: not received to obtain the first receiving status information.

Optionally, the apparatus further includes a third setting module configured to:

preset a fourth preset number of pieces of initial receiving status information with empty content;

set each piece of initial receiving status information to the idle information table.

Optionally, the second constructing module 606 is further configured to:

determine a field number corresponding to the data identification of the fourth sub data packet in the receiving information maintenance table;

construct an association relationship between the first receiving status information and a field indicated by the field number in the receiving information maintenance table.

Optionally, the second constructing module 606 is further configured to:

in a case that the field indicated by the field number is associated with the third receiving status information, jointly construct an association relationship with the field indicated by the field number for the first receiving status information and the third receiving status information in series or in parallel, where the third receiving status information is receiving status information corresponding to a sub data packet that has not been received.

An embodiment of the present specification provides a data transmission apparatus. After receiving a third sub data packet, a receiving end may acquire a target data identification of the third sub data packet, and determine a recording manner subsequently applied to the third sub data packet based on the target data identification. In a case that the target data identification is greater than a current maximum to-be-received data identification, the receiving end may determine, according to the target data identification, the fourth sub data packet that has not been received before the third sub data packet, and maintain, based on the receiving information maintenance table, a receiving status of each fourth sub data packet which should have been received in accordance with the sequence but has not been received in fact, thereby knowing which sub data packet has not been received successfully. When a small amount of packet loss occurs, not only the sub data packets behind a packet loss point may be successfully received and reported to an application layer, but also subsequent sub data packets can be continued to be received without affecting a subsequent bandwidth of the connection at all. That is, the loss of a certain sub data packet will not affect the receiving and reporting of the subsequent sub data packets, avoiding head-of-line blocking, and it may be clearly known that which sub data packet is not received successfully, a reliability of data transmission may be improved.

The above is a schematic solution of the data transmission apparatus in the embodiment. It should be noted that the technical solution of the data transmission apparatus and the technical solution of the above data transmission method belong to the same concept. For detail contents that are not described in detail in the technical solution of the data transmission apparatus, reference may be made to the description of the technical solution of the above data transmission method.

Figure 7:
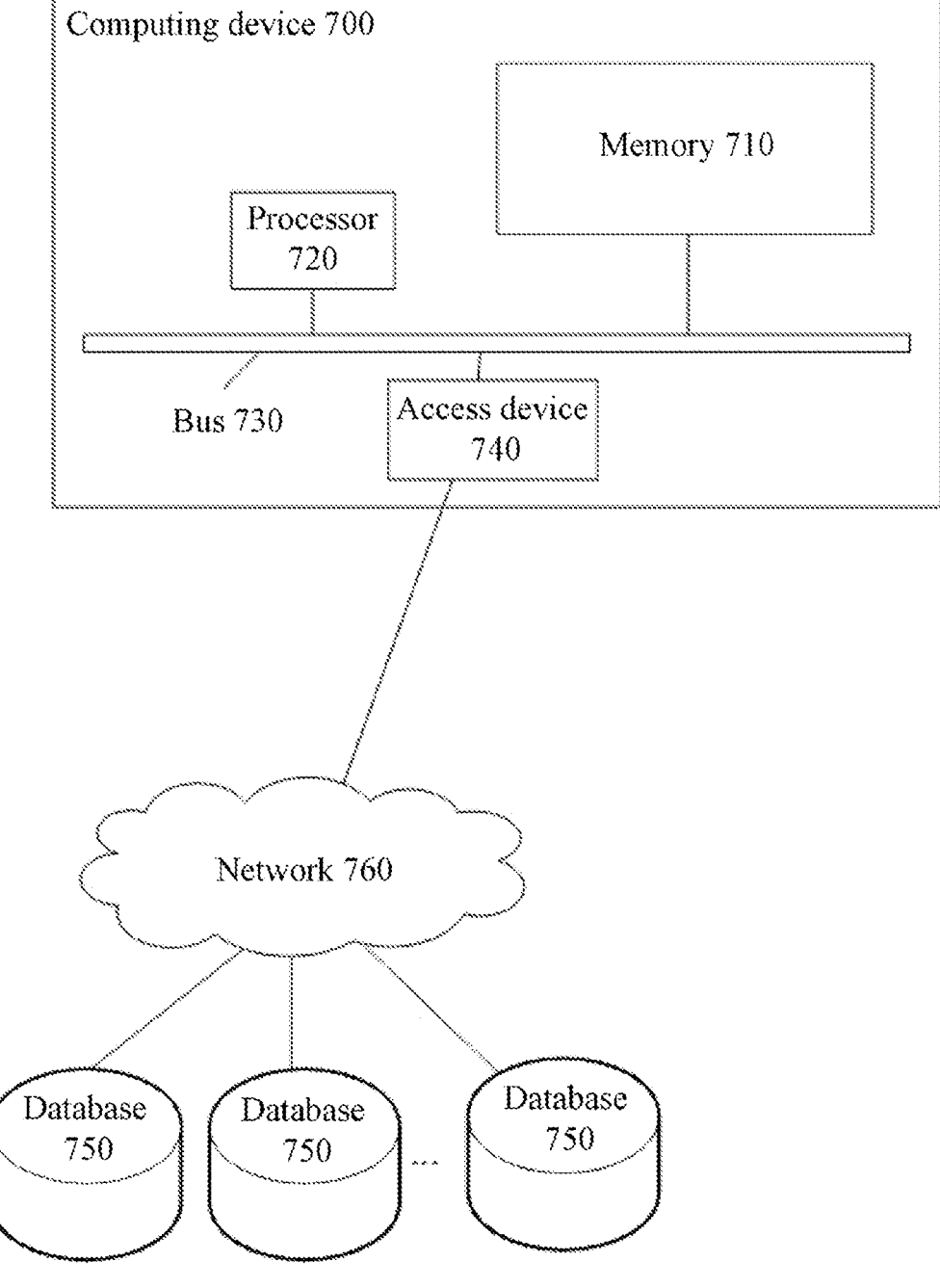
FIG. 7 is a structural block diagram of a computing device provided by an embodiment of the present specification.

FIG. 7 shows a structural block diagram of a computing device provided by an embodiment of the present specification. Components of the computing device 700 include, but are not limited to, a memory 710 and a processor 720. The processor 720 is connected to the memory 710 through a bus 730, and a database 750 is used to save data.

The computing device 700 also includes an access device 740 enabling the computing device 700 to communicate via one or more networks 760. Examples of these networks include a public switched telephone network (PSTN, Public Switched Telephone Network), local area network (LAN, Local Area Network), wide area network (WAN, Wide Area Network), personal area network (PAN, Personal Area Network), or a combination of communication networks such as the Internet. The access device 940 may include one or more of any type of network interfaces (for example, a network interface controller (NIC, Network Interface Controller)), wired or wireless, such as IEEE 802.11 wireless local area network (WLANs, Wireless Local Area Networks) wireless interface, worldwide interoperability for microwave access (Wi-MAX, Worldwide Interoperability for Microwave Access) interface, Ethernet interface, universal serial bus (USB, Universal Serial Bus) interface, cellular network interface, Bluetooth interface, near field communication (NFC, Near Field Communication), Near Field Communication) interface, and the like.

In an embodiment of the present description, the above components of the computing device 700 and other components not shown in FIG. 7 may also be connected to each other, for example through the bus. It should be understood that the structural block diagram of the computing device shown in FIG. 7 is for exemplary purposes only and does not limit the scope of the present description. Those skilled in the art may add other components or make replacement with other components according to the need.

The computing device 700 may be any type of stationary or mobile computing device, including a mobile computer or a mobile computing device (for example, a tablet computer, a personal digital assistant, a laptop computer, a notebook computer, a netbook, etc.), a mobile telephone (for example, a smartphone), a wearable computing device (for example, a smart watch, smart glasses, etc.) or other type of mobile devices, or the stationary computing device such as a desktop computer or a PC. The computing device 700 may also be a mobile or stationary server.

The processor 720 is configured to execute the following computer executable instructions, when the computer executable instructions are executed by the processor, steps of the above data transmission method are implemented.

The above is a schematic solution of the computing device in the embodiment. It should be noted that the technical solution of the computing device and the technical solution of the above data transmission method belong to the same concept. For detailed contents that are not described in detail in the technical solution of the computing device, reference may be made to the description of the technical solution of the above data transmission method.

An embodiment of the present specification also provides a computer readable storage medium, having computer executable instructions stored therein, when the computer executable instructions are executed by a processor, steps of the above data transmission method are implemented.

The above is a schematic solution of the computer readable storage medium in the embodiment. It should be noted that the technical solution of the storage medium and the technical solution of the above data transmission method belong to the same concept. For detailed contents that are not described in detail in the technical solution of the storage medium, reference may be made to the description of the technical solution of the above data transmission method.

An embodiment of the present specification also provides a computer program, where when the computer program is executed in a computer, the computer is caused to execute steps of the above data transmission method.

The above is a schematic solution of the computer program in the embodiment. It should be noted that the technical solution of the computer program and the technical solution of the above data transmission method belong to the same concept. For detailed contents that are not described in detail in the technical solution of the computer program, reference may be made to the description of the technical solution of the above data transmission method.

The above describes specific embodiments of the present specification. Other embodiments are within the scope of the appendant claims. In some cases, the actions or steps recited in the claims may be executed in a different order than in the embodiments and still achieve desired results. In addition, the processes described in the accompanying figures do not necessarily require the shown particular order, or sequential order, to achieve desirable results. Multitasking and parallel processing are also possible or may be advantageous in certain embodiments.

The computer instructions include computer program codes, which may be in the form of source code, object code, executable file or some intermediate forms. The computer readable medium may include: any entity or apparatus that can carry computer program codes, a recording medium, an USB flash drive, a mobile hard drive, a magnetic disk, an optical disk, a computer memory, a read-only memory (ROM, Read-Only Memory), a random access memory (RAM, Random Access Memory), an electrical carrier signal, a telecommunication signal, and a software distribution medium, etc. It should be noted that the content contained in the computer readable medium may be appropriately increased or decreased according to the requirements of legislation and patent practice in the jurisdiction. For example, in some jurisdictions, according to legislation and patent practice, the computer readable medium does not include the electrical carrier signal and the telecommunications signal.

It should be noted that for the convenience of description, each of the foregoing method embodiments is expressed as a series of action combinations. However, those skilled in the art should know that the embodiments of the present specification are not limited by the described action sequence, because according to the embodiments of the present specification, certain steps may be performed in other orders or at the same time. Secondly, those skilled in the art should also know that the embodiments described in the specification are preferred embodiments, and the actions and modules involved are not necessarily required for the embodiments of the present specification.

In the above embodiments, each embodiment is described with its own emphasis. For parts that are not described in detail in a certain embodiment, please refer to the relevant descriptions of other embodiments.

The preferred embodiments of the present specification disclosed above are only used to help explain the present specification. Alternative embodiments are not described in all details, nor are the inventions limited to the specific embodiments described. Obviously, many modifications and changes may be made based on the contents of the embodiments of the present specification. These embodiments are selected and described in detail in the present specification to better explain the principles and practical applications of the embodiments in the present specification, so that those skilled in the art can better understand and utilize the present specification. The present specification is limited only by the claims and full scope thereof and equivalents.

The invention claimed is:

1. A data transmission method, applied to a sending end, comprising:

sending a first preset number of sub data packets to a receiving end;

setting data information of a first sub data packet in initial sending status information to obtain first sending status information, and constructing an association relationship between the first sending status information and a corresponding field in a sending information maintenance table, wherein the sending information maintenance table comprises a second preset number of fields, and the first sub data packet is any sub data packet in the first preset number of sub data packets; and in a case that confirmation information returned by the receiving end is received, determining a second sub data packet corresponding to the confirmation information, and determining second sending status information corresponding to the second sub data packet, and removing an association relationship between the second sending status information and a corresponding field in the sending information maintenance table, wherein the second sub data packet is a sub data packet for which the confirmation information is returned by the receiving end in the first preset number of sub data packets.

2. The data transmission method according to claim 1, before the sending the first preset number of sub data packets to the receiving end, further comprising:

splitting a to-be-transmitted data packet into at least two sub data packets;

setting a starting data identification for a headmost sub data packet among the at least two sub data packets; and setting, according to the starting data identification, a corresponding data identification for a sub data packet following the headmost sub data packet in the at least two sub data packets.

3. The data transmission method according to claim 2, wherein the initial sending status information comprises a data identification field and a confirmation information identification field, and the confirmation information identification field is used to identify whether confirmation information returned by the receiving end for the first sub data packet has been received;

the setting the data information of the first sub data packet in the initial sending status information to obtain the first sending status information comprising:

determining a data identification of the first sub data packet, and setting the data identification of the first sub data packet for the data identification field in the initial sending status information; and setting the confirmation information identification field of the initial sending status information to that the confirmation information has not been received to obtain first sending status information.

4. The data transmission method according to claim 1, the constructing the association relationship between the first sending status information and the corresponding field in the sending information maintenance table comprising:

determining a sequence number of the first sub data packet in the first preset number of sub data packets;

determining, according to the sequence number and the second preset number, a corresponding field number of the first sub data packet in the sending information maintenance table; and constructing an association relationship between the first sending status information and a field indicated by the field number in the sending information maintenance table.

5. The data transmission method according to claim 1, after the removing the association relationship between the second sending status information and the corresponding field in the sending information maintenance table, further comprising:

emptying data information filled in the second sending status information to obtain the initial sending status information, and setting the initial sending status information as an idle information table; and using a determined amount of the second sub data packet as the first preset number, continuing to return to an operation step of sending the first preset number of sub data packets to the receiving end, wherein the amount of the second sub data packet is less than or equal to an initial first preset number.

6. A non-transitory computer readable storage medium, having computer executable instructions stored therein, wherein when the computer executable instructions are executed by a processor, steps of the data transmission method of claim 1 are implemented.

7. A data transmission apparatus, applied to a sending end, comprising: a memory and a processor;

wherein the memory is used to store computer executable instructions, and the processor is used to execute the computer executable instructions, when the computer executable instructions are executed by the processor to cause the processor to:

send first preset number of sub data packets to a receiving end;

set data information of a first sub data packet in initial sending status information to obtain first sending status information, and construct an association relationship between the first sending status information and a corresponding field in a sending information maintenance table, wherein the sending information maintenance table comprises a second preset number of fields, and the first sub data packet is any sub data packet in the first preset number of sub data packets; and in a case that confirmation information returned by the receiving end is received, determine a second sub data packet corresponding to the confirmation information, and determine second sending status information corresponding to the second sub data packet, and remove an association relationship between the second sending status information and a corresponding field in the sending information maintenance table, wherein the second sub data packet is a sub data packet for which the confirmation information is returned by the receiving end in the first preset number of sub data packets.

8. The data transmission apparatus according to claim 7, wherein the processor is configured to:

split a to-be-transmitted data packet into at least two sub data packets;

set a starting data identification for a headmost sub data packet among the at least two sub data packets; and set, according to the starting data identification, a corresponding data identification for a sub data packet following the headmost sub data packet in the at least two sub data packets.

9. The data transmission apparatus according to claim 8, wherein the initial sending status information comprises a data identification field and a confirmation information identification field, and the confirmation information identification field is used to identify whether confirmation information returned by the receiving end for the first sub data packet has been received;

the processor is configured to:

determine a data identification of the first sub data packet, and set the data identification of the first sub data packet for the data identification field in the initial sending status information; and set the confirmation information identification field of the initial sending status information to that the confirmation information has not been received to obtain first sending status information.

10. The data transmission apparatus according to claim 7, wherein the processor is configured to:

determine a sequence number of the first sub data packet in the first preset number of sub data packets;

determine, according to the sequence number and the second preset number, a corresponding field number of the first sub data packet in the sending information maintenance table; and construct an association relationship between the first sending status information and a field indicated by the field number in the sending information maintenance table.

11. The data transmission apparatus according to claim 7, wherein the processor is configured to:

emptying data information filled in the second sending status information to obtain the initial sending status information, and setting the initial sending status information as an idle information table; and use a determined amount of the second sub data packet as the first preset number, continue to return to an operation step of sending the first preset number of sub data packets to the receiving end, wherein the amount of the second sub data packet is less than or equal to an initial first preset number.

\* \* \* \* \*